United States Patent
Ryu et al.

(10) Patent No.: US 10,611,207 B2
(45) Date of Patent: Apr. 7, 2020

(54) AIR CONDITIONING SYSTEM FOR VEHICLE

(71) Applicant: Hanon Systems, Daejeon (KR)

(72) Inventors: Jae Chun Ryu, Daejeon (KR); Young Hum Han, Daejeon (KR); Chul Hee Kim, Daejeon (KR); Joong Man Han, Daejeon (KR); Tae Yong Park, Daejeon (KR); Yong Nam Ahn, Daejeon (KR); Doo Hoon Kim, Daejeon (KR); Yun Jin Kim, Daejeon (KR); Hyeon Gyu Kim, Daejeon (KR); Sung Je Lee, Daejeon (KR)

(73) Assignee: Hanon Systems, Daejeon (KR)

( * ) Notice: Subject to any disclaimer, the term of this patent is extended or adjusted under 35 U.S.C. 154(b) by 225 days.

(21) Appl. No.: 15/408,636

(22) Filed: Jan. 18, 2017

(65) Prior Publication Data
US 2017/0203631 A1    Jul. 20, 2017

(30) Foreign Application Priority Data

Jan. 18, 2016 (KR) .................. 10-2016-0005782
Jan. 18, 2016 (KR) .................. 10-2016-0005787

(Continued)

(51) Int. Cl.
*B60H 1/00* (2006.01)
*B60H 1/22* (2006.01)
*B60H 1/32* (2006.01)

(52) U.S. Cl.
CPC ..... *B60H 1/00028* (2013.01); *B60H 1/00535* (2013.01); *B60H 1/22* (2013.01);
(Continued)

(58) Field of Classification Search
CPC .. B60H 1/00028; B60H 1/00535; B60H 1/22; B60H 1/3204; B60H 1/2225;
(Continued)

(56) References Cited

U.S. PATENT DOCUMENTS 2,241,579 A * 5/1941 Bergstrom ........... B60H 1/3204
62/179
2,780,077 A * 2/1957 Jacobs ............... B60H 1/00007
165/43

(Continued)

FOREIGN PATENT DOCUMENTS

EP    1389542 A2    2/2004
EP    1526017 A2    4/2005
(Continued)

*Primary Examiner* — Ljiljana V. Ciric
(74) *Attorney, Agent, or Firm* — Norton Rose Fulbright US LLP

(57) ABSTRACT

Air conditioning system for a vehicle which includes an air-conditioning module having an air-conditioning case, which has a cold air passageway and a warm air passageway partitioned from each other, and a blower unit, and an indoor air inflow duct for introducing indoor air of the interior of the vehicle into the blower unit. An outlet of the air-conditioning case and an inlet of the indoor air inflow port are arranged to be adjacent to each other, so that the air conditioning system for a vehicle can be installed through just one through hole part formed in a dash panel.

20 Claims, 14 Drawing Sheets

(30) Foreign Application Priority Data

Jan. 18, 2016 (KR) .................. 10-2016-0005816
Jul. 25, 2016 (KR) .................. 10-2016-0094062

(52) U.S. Cl.
CPC ......... *B60H 1/2225* (2013.01); *B60H 1/3204* (2013.01); *B60H 2001/00085* (2013.01); *B60H 2001/00135* (2013.01); *B60H 2001/00214* (2013.01)

(58) Field of Classification Search
CPC ........... B60H 2001/00214; B60H 2001/00135; B60H 2001/00085
USPC .................................................. 62/239, 244
See application file for complete search history.

(56) References Cited

U.S. PATENT DOCUMENTS

| | | | | |
|---|---|---|---|---|
| 4,453,591 A * | 6/1984 | Fehr | B60H 1/00064 | 165/202 |
| 4,482,009 A * | 11/1984 | Nishimura | B60H 1/00842 | 165/203 |
| 4,560,103 A * | 12/1985 | Schulz | B60H 1/00035 | 236/13 |
| 4,566,531 A * | 1/1986 | Stolz | B60H 1/00007 | 165/42 |
| 4,582,252 A * | 4/1986 | Ogihara | B60H 1/00064 | 237/12.3 A |
| 4,759,269 A * | 7/1988 | Brown | B60H 1/00842 | 165/217 |
| 4,842,047 A | 6/1989 | Sakurada et al. | | |
| 4,940,083 A * | 7/1990 | Takenaka | B60H 1/00035 | 165/202 |
| 5,309,731 A * | 5/1994 | Nonoyama | B60H 1/00849 | 62/244 |
| 5,390,728 A * | 2/1995 | Ban | B60H 1/00742 | 165/202 |
| 5,478,274 A * | 12/1995 | Danieau | B60H 1/00064 | 165/43 |
| 5,526,650 A * | 6/1996 | Iritani | B60H 1/00907 | 62/205 |
| 5,582,234 A * | 12/1996 | Samukawa | B60H 1/00735 | 165/204 |
| 5,669,813 A * | 9/1997 | Jairazbhoy | B60H 1/00271 | 361/645 |
| 5,699,960 A * | 12/1997 | Kato | B60H 1/0065 | 237/12.3 A |
| 5,884,689 A * | 3/1999 | Takechi | B60H 1/00021 | 165/43 |
| 5,901,572 A * | 5/1999 | Peiffer | B60H 1/00 | 62/480 |
| 5,934,989 A * | 8/1999 | Yamamoto | B60H 1/00028 | 454/156 |
| 5,996,365 A * | 12/1999 | Tanaka | B60H 1/00064 | 62/160 |
| 6,016,967 A * | 1/2000 | Takechi | B60H 1/00064 | 237/12.3 R |
| 6,079,484 A * | 6/2000 | Uemura | B60H 1/00064 | 165/202 |
| 6,145,754 A * | 11/2000 | Uemura | B60H 1/00735 | 165/203 |
| 6,166,351 A * | 12/2000 | Yamamoto | B60H 1/00064 | 219/202 |
| 6,192,698 B1 * | 2/2001 | Kakehashi | B60H 1/00064 | 165/203 |
| 6,205,805 B1 * | 3/2001 | Takahashi | B60H 3/024 | 62/271 |
| 6,206,092 B1 * | 3/2001 | Beck | B60H 1/00064 | 165/203 |
| 6,213,198 B1 * | 4/2001 | Shikata | B60H 1/00478 | 165/202 |
| 6,244,335 B1 * | 6/2001 | Nakamura | B60H 1/00028 | 165/203 |
| 6,308,770 B1 * | 10/2001 | Shikata | B60H 1/00064 | 165/126 |
| 6,371,202 B1 * | 4/2002 | Takano | B60H 1/00914 | 165/202 |
| 6,422,309 B2 * | 7/2002 | Vincent | B60H 1/00064 | 165/202 |
| 6,527,548 B1 * | 3/2003 | Kushch | B60H 1/22 | 123/142.5 R |
| 6,547,152 B1 * | 4/2003 | Pawlak, III | B60H 1/00028 | 165/41 |
| 6,886,350 B2 * | 5/2005 | Petesch | B60H 1/00064 | 165/42 |
| 7,082,990 B1 * | 8/2006 | Uemura | B60H 1/00849 | 165/203 |
| 8,267,155 B2 * | 9/2012 | Katsuki | B60H 1/00064 | 165/41 |
| 8,267,165 B2 * | 9/2012 | Nanaumi | B60H 1/00064 | 165/201 |
| 8,376,037 B2 * | 2/2013 | Nanaumi | B60H 1/00064 | 165/203 |
| 8,403,029 B2 * | 3/2013 | Nanaumi | B60H 1/00028 | 165/41 |
| 8,408,980 B2 * | 4/2013 | Nanaumi | B60H 1/00564 | 454/121 |
| 8,662,157 B2 * | 3/2014 | Kitamura | B60H 1/00064 | 165/204 |
| 8,997,838 B2 * | 4/2015 | Seto | B60H 1/00678 | 165/204 |
| 9,102,214 B2 * | 8/2015 | Kishi | B60H 1/00849 | |
| 9,174,511 B2 * | 11/2015 | Seto | B60H 1/00064 | |
| 9,649,907 B2 * | 5/2017 | Kakizaki | B60H 1/00064 | |
| 9,821,626 B2 * | 11/2017 | Wittmann | B60H 1/0005 | |
| 10,239,543 B2 * | 3/2019 | Frank | B60H 1/00864 | |
| 10,391,832 B2 * | 8/2019 | Morris | B60H 1/00828 | |
| 10,449,824 B2 * | 10/2019 | Won | B60H 1/00264 | |
| 10,449,825 B2 * | 10/2019 | Woo | B60H 1/00057 | |
| 10,479,161 B2 * | 11/2019 | Ryu | B60H 1/00 | |
| 10,479,164 B2 * | 11/2019 | Ryu | F04D 29/4213 | |
| 2001/0025707 A1 * | 10/2001 | Onda | B60H 1/00028 | 165/202 |
| 2002/0017383 A1 * | 2/2002 | Vincent | B60H 1/00064 | 165/204 |
| 2003/0000691 A1 * | 1/2003 | Kim | B60H 1/00064 | 165/203 |
| 2003/0037918 A1 * | 2/2003 | Lee | B60H 1/00064 | 165/202 |
| 2003/0056531 A1 * | 3/2003 | Nishida | B60H 1/00064 | 62/244 |
| 2003/0116303 A1 * | 6/2003 | Kang | B60H 1/00064 | 165/42 |
| 2003/0205370 A1 * | 11/2003 | Kim | B60H 1/00064 | 165/204 |
| 2003/0213258 A1 * | 11/2003 | Kaneura | B60H 1/00028 | 62/244 |
| 2004/0025517 A1 * | 2/2004 | Fong | B60H 1/00478 | 62/3.61 |
| 2004/0154327 A1 * | 8/2004 | Okazaki | B60H 1/00514 | 62/244 |
| 2005/0022538 A1 * | 2/2005 | Takagi | B60H 1/00321 | 62/3.1 |
| 2005/0196652 A1 * | 9/2005 | Grieve | C01B 3/38 | 429/415 |
| 2005/0217295 A1 * | 10/2005 | Alberternst | B60H 1/0005 | 62/239 |
| 2006/0000594 A1 * | 1/2006 | Kang | B60H 1/00064 | 165/203 |
| 2006/0000595 A1 * | 1/2006 | Kang | B60H 1/00064 | 165/203 |
| 2006/0260783 A1 * | 11/2006 | Park | B60H 1/00471 | 165/42 |
| 2007/0095517 A1 * | 5/2007 | Schall | B60H 1/00028 | 165/204 |
| 2007/0137833 A1 * | 6/2007 | Kang | B60H 1/00064 | 165/42 |

(56) References Cited

U.S. PATENT DOCUMENTS

| | | | |
|---|---|---|---|
| 2007/0140312 A1* | 6/2007 | Seo | G01K 1/14 374/145 |
| 2007/0266726 A1* | 11/2007 | Tada | B60H 1/00064 62/331 |
| 2008/0061159 A1* | 3/2008 | Okano | B60H 1/2225 237/12.3 A |
| 2009/0028534 A1* | 1/2009 | Hartmann | B60H 1/2225 392/485 |
| 2010/0025011 A1* | 2/2010 | Chikagawa | B60H 1/00028 165/61 |
| 2010/0120348 A1* | 5/2010 | Tanaka | B60H 1/00678 454/159 |
| 2010/0304654 A1* | 12/2010 | Kakizaki | B60H 1/00064 454/121 |
| 2011/0036117 A1* | 2/2011 | Frohling | B60H 1/00028 62/507 |
| 2011/0048673 A1* | 3/2011 | Kim | B60H 1/00028 165/61 |
| 2012/0102973 A1* | 5/2012 | Oh | B60H 1/00028 62/3.61 |
| 2012/0214394 A1* | 8/2012 | Kanemaru | B60H 1/00471 454/139 |
| 2013/0146248 A1* | 6/2013 | Kim | B60H 1/00028 165/42 |
| 2013/0333406 A1* | 12/2013 | Takahashi | B60H 1/00921 62/238.7 |
| 2014/0048227 A1* | 2/2014 | Saitou | B60H 1/0005 165/48.1 |
| 2014/0075973 A1* | 3/2014 | Graaf | B60H 1/00328 62/115 |
| 2015/0082820 A1* | 3/2015 | Takahashi | B60H 1/0005 62/238.7 |
| 2016/0001628 A1* | 1/2016 | Kakizaki | B60H 1/00835 62/157 |
| 2016/0052364 A1* | 2/2016 | Sogawa | B60H 1/00028 454/147 |
| 2016/0229266 A1* | 8/2016 | Maeda | B60H 1/0005 |
| 2016/0236535 A1* | 8/2016 | Kuwayama | B60H 1/00064 |
| 2016/0288609 A1* | 10/2016 | Yamaoka | B60H 1/00021 |
| 2017/0059230 A1* | 3/2017 | Mazzocco | F25D 21/14 |
| 2017/0106716 A1* | 4/2017 | Hirai | B60H 1/00028 |
| 2017/0120717 A1* | 5/2017 | Sekito | B60H 1/00028 |
| 2017/0129309 A1* | 5/2017 | Lee | B60H 1/00 |
| 2017/0203631 A1* | 7/2017 | Ryu | B60H 1/22 |
| 2017/0274731 A1* | 9/2017 | Klinkhammer | B60H 1/00471 |
| 2017/0291468 A1* | 10/2017 | Jung | B60H 1/00064 |
| 2018/0126820 A1* | 5/2018 | Makimoto | B60H 1/00028 |
| 2018/0162190 A1* | 6/2018 | Hensler | B60H 1/0005 |
| 2018/0170147 A1* | 6/2018 | Wright | B60H 1/00849 |
| 2018/0312029 A1* | 11/2018 | Ito | B60H 1/00064 |
| 2018/0361819 A1* | 12/2018 | Ryu | B60H 1/00028 |
| 2018/0361824 A1* | 12/2018 | Ryu | B60H 1/00871 |

FOREIGN PATENT DOCUMENTS

| | | |
|---|---|---|
| EP | 2679419 A1 | 1/2014 |
| JP | 2000055449 A | 2/2000 |
| JP | 2001347821 A | 12/2001 |
| JP | 2003291627 A | 10/2003 |
| JP | 2004314759 A | 11/2004 |
| JP | 2005022600 A | 1/2005 |
| JP | 2006205831 A | 8/2006 |
| JP | 2013151183 A | 8/2013 |
| KR | 20130053695 A | 5/2013 |
| WO | 2013105200 A1 | 7/2013 |
| WO | 2013105203 A1 | 7/2013 |

* cited by examiner

PRIOR ART

AIR CONDITIONING SYSTEM FOR VEHICLE

This application claims priority from Korean Patent Application Nos. 10-2016-0005787 filed on Jan. 18, 2016, 10-2016-0005816 filed on Jan. 18, 2016, 10-2016-0005782 filed Jan. 18, 2016 and 10-2016-0094062 filed on Jul. 25, 2016, which are hereby incorporated by reference in their entireties.

BACKGROUND OF THE INVENTION

Field of the Invention

The present invention relates to an air conditioning system for a vehicle, and more particularly, to an air conditioning system for a vehicle which includes an air-conditioning module having an air-conditioning case, which has a cold air passageway and a warm air passageway partitioned from each other, and a blower unit, and an indoor air inflow duct for introducing indoor air of the interior of the vehicle into the blower unit, wherein an outlet of the air-conditioning case and an inlet of the indoor air inflow port are arranged to be adjacent to each other, so that the air conditioning system for a vehicle can be installed through just one through hole part formed in a dash panel.

Background Art

In general, as shown in FIG. 1, an air conditioner system for a vehicle has a refrigeration cycle that includes: a compressor 1 for compressing and discharging refrigerant; a condenser 2 for condensing the refrigerant of high pressure discharged from the compressor 1; an expansion valve 3 for throttling the refrigerant condensed and liquefied in the condenser 2; and an evaporator 4 for exchanging heat between the liquefied refrigerant of low pressure throttled by the expansion valve 3 and air blown to the interior of the vehicle and evaporating the refrigerant to cool the air discharged to the interior of the vehicle due to heat absorption by evaporative latent heat, and that the compressor 1, the condenser 2, the expansion valve 3 and the evaporator 4 are connected with each other via refrigeration pipes. The air conditioner system cools the interior of the vehicle through the following refrigerant circulation process.

When a cooling switch (not shown) of the air conditioner system is turned on, first, the compressor 1 inhales and compresses vapor-phase refrigerant of low-temperature and low-pressure while driving by driving power of an engine or a motor, and then sends the refrigerant in the gaseous phase of high-temperature and high-pressure to the condenser 2. Then, the condenser 2 condenses the vapor-phase refrigerant into liquid-phase refrigerant of high-temperature and high-pressure by exchanging heat with outdoor air. After that, the liquid-phase refrigerant of high-temperature and high-pressure sent from the condenser 2 rapidly expands by a throttling action of the expansion valve 3 and is sent to the evaporator 4 in a wet-saturated state of low-temperature and low-pressure. The evaporator 4 exchanges heat between the refrigerant and air blown to the interior of the vehicle by a blower (not shown). Then, the refrigerant is evaporated in the evaporator 4 and discharged in a gaseous phase of low-temperature and low-pressure. After that, the vapor-phase refrigerant is inhaled into the compressor 1, and then, recirculates the refrigeration cycle as described above.

The evaporator is mounted inside the air-conditioning case mounted to the interior of the vehicle to cool the interior of the vehicle. That is, the air blown by the blower (not shown) is cooled by evaporative latent heat of the liquid-phase refrigerant circulating inside the evaporator 4 and discharged to the interior of the vehicle in a cooled state so as to cool the interior of the vehicle.

Moreover, the interior of the vehicle is heated by a heater core (not shown) which is mounted inside the air-conditioning case and through which coolant of the engine circulates or by an electric heater (not shown) mounted inside the air-conditioning case.

In the meantime, the condenser 2 is mounted at the front side of the vehicle to radiate heat while exchanging heat with air.

Recently, an air conditioning system which carries out heating and cooling only using a refrigeration cycle has been developed. As shown in FIG. 2, such an air conditioning system includes: a cold air passageway 11 and a warm air passageway 12 which are partitioned to the right and the left inside one air-conditioning case 10; an evaporator 4 mounted on the cold air passageway 11 for cooling; and a condenser 2 mounted on the warm air passageway 12 for heating.

In this instance, at an outlet of the air-conditioning case 10, formed are a plurality of air outflow ports 15 for supplying air to the interior of the vehicle and a plurality of air discharge ports 16 for discharging air to the exterior of the vehicle.

Furthermore, blowers 20 which are operated individually are respectively mounted at an inlet of the cold air passageway 11 and at an inlet of the warm air passageway 12. The air-conditioning case 10 and the blowers 20 in the air conditioning system are mounted inside the interior of the vehicle based on a dash panel (not shown), which partitions an engine room from the interior of the vehicle.

Therefore, in a cooling mode, cold air cooled while passing through the evaporator 4 of the cold air passageway 11 is discharged to the interior of the vehicle through the air outflow port 15 to cool the interior of the vehicle, and in this instance, warm air heated while passing through the condenser 2 of the warm air passageway 12 is discharged to the exterior of the vehicle through the air discharge port 16.

In a heating mode, warm air heated while passing through the condenser 2 of the warm air passageway 12 is discharged to the interior of the vehicle through the air outflow port 15 to heat the interior of the vehicle, and in this instance, cold air cooled while passing through the evaporator 4 of the cold air passageway 11 is discharged to the exterior of the vehicle through the air discharge port 16.

However, the conventional air conditioning system includes the air-conditioning case 10, which has the evaporator 4 and the condenser 2 therein, and the blowers 20 mounted inside the interior of the vehicle based on the dash panel. Therefore, the conventional air conditioning system has several disadvantages in that noise and vibration inside the interior of the vehicle increase and in that it is difficult to secure a space of the interior of the vehicle because the air-conditioning case 10 and the blowers 20 occupy a wide space inside the interior of the vehicle.

If the air-conditioning case 10 and the blowers 20 are mounted at the engine room, the dash panel must have a plurality of through holes in order to discharge air and supply indoor air from the air-conditioning case 10.

SUMMARY OF THE INVENTION

Accordingly, the present invention has been made in view of the above-mentioned problems occurring in the prior art, and it is an object of the present invention to provide an air conditioning system for a vehicle which includes an air-conditioning module having an air-conditioning case, which has a cold air passageway and a warm air passageway partitioned from each other, and a blower unit, and an indoor air inflow duct for introducing indoor air of the interior of the vehicle into the blower unit, wherein an outlet of the air-conditioning case and an inlet of the indoor air inflow port are arranged to be adjacent to each other, so that the air conditioning system for a vehicle can be installed through just one through hole part formed in a dash panel, thereby enhancing assemblability and reducing weight and an installation cost.

It is another object of the present invention to provide an air conditioning system for a vehicle which can be arranged on an engine room side through just one through hole part formed in the dash panel, thereby reducing noise and vibration inside the vehicle and maximizing an inside space of the vehicle.

To accomplish the above object, according to the present invention, there is provided an air conditioning system for a vehicle including: an air-conditioning case having a cold air passageway, a warm air passageway and an outlet for discharging air passing through the cold and warm air passageways; a blower unit for blowing indoor and outdoor air to the cold air passageway and the warm air passageway; and an indoor air inflow duct which is mounted on the air-conditioning case and connects the blower unit with the interior of the vehicle so as to introduce the indoor air of the vehicle to the blower unit, wherein the outlet of the air-conditioning case and an inlet of the indoor air inflow duct are arranged to be adjacent to each other and are separated from each other by separating means.

As described above, the air conditioning system for the vehicle according to the present invention includes the air-conditioning module, which has the air-conditioning case having the cold air passageway and the warm air passageway partitioned from each other and the blower unit, and the indoor air inflow duct for introducing indoor air of the interior of the vehicle into the blower unit, wherein an outlet of the air-conditioning case and an inlet of the indoor air inflow port are arranged to be adjacent to each other, so that the air conditioning system for a vehicle can be installed through just one through hole part formed in a dash panel, thereby enhancing assemblability and reducing weight and an installation cost.

Moreover, because the air-conditioning module can be arranged on an engine room through just one through hole part formed in the dash panel, the air conditioning system for a vehicle can reduce noise and vibration inside the vehicle and secure an inside space of the vehicle to the maximum.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
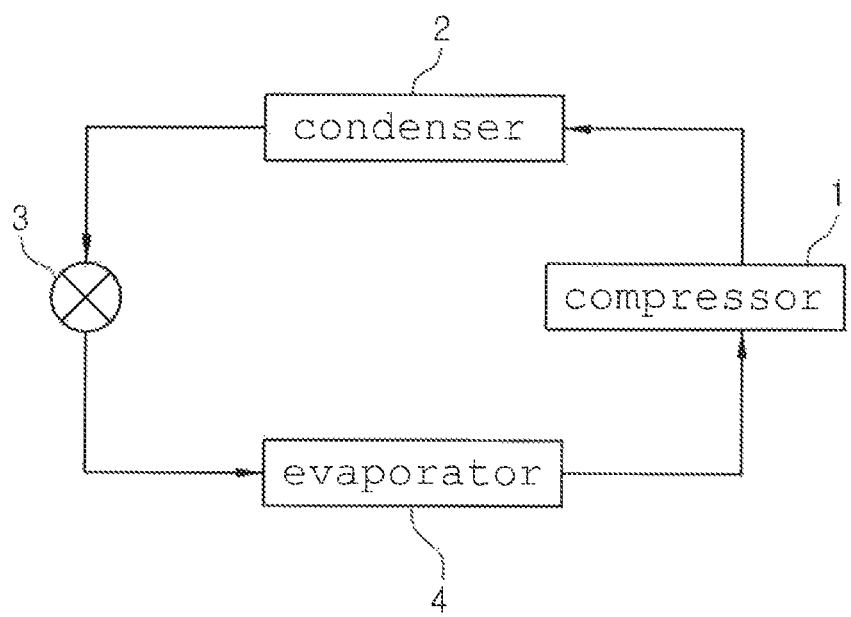
FIG. 1 is a configurative diagram showing a refrigeration cycle of a general air conditioning system for a vehicle.
Figure 2:
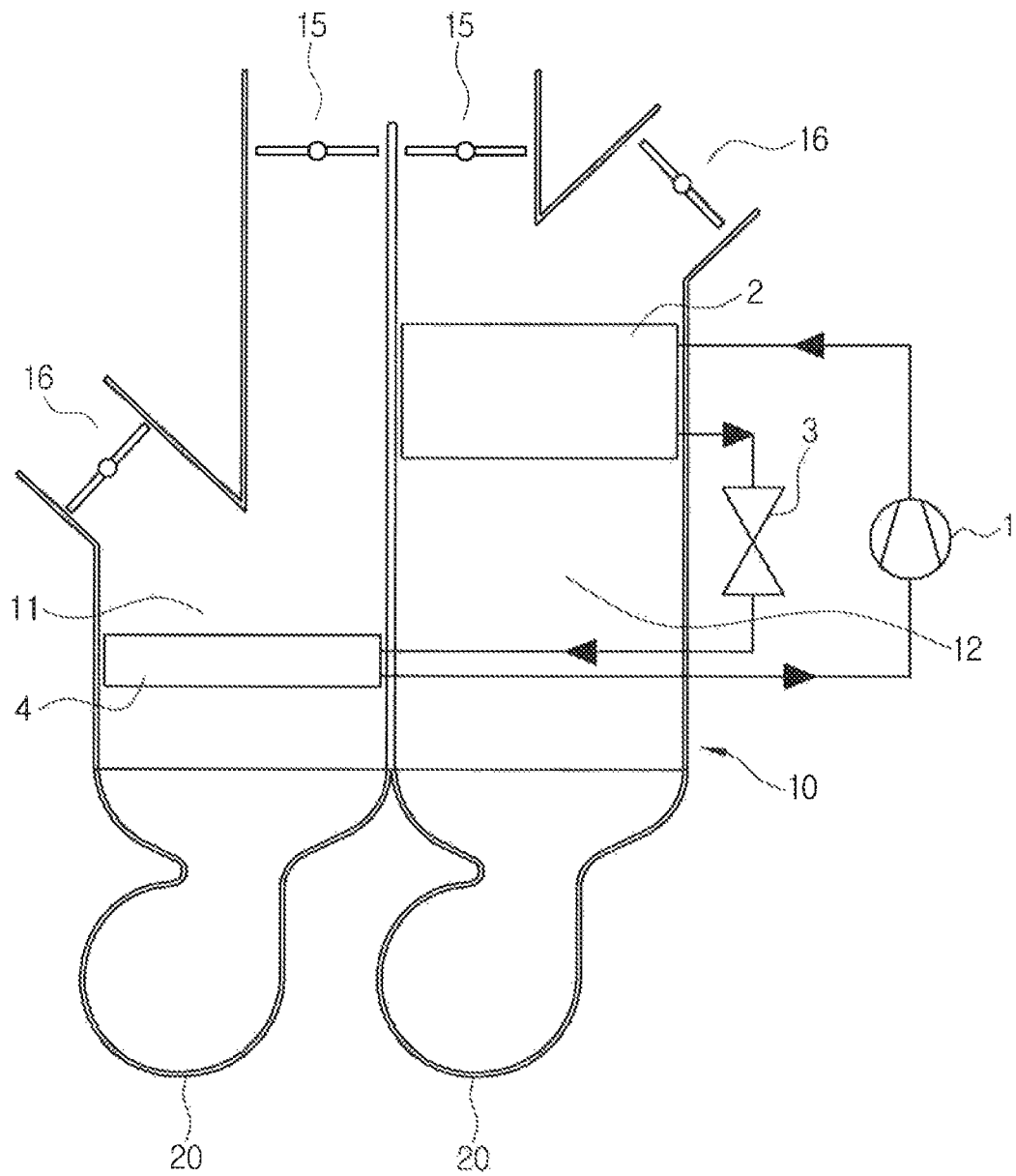
FIG. 2 is a view showing a conventional air conditioning system for a vehicle.
Figure 3:
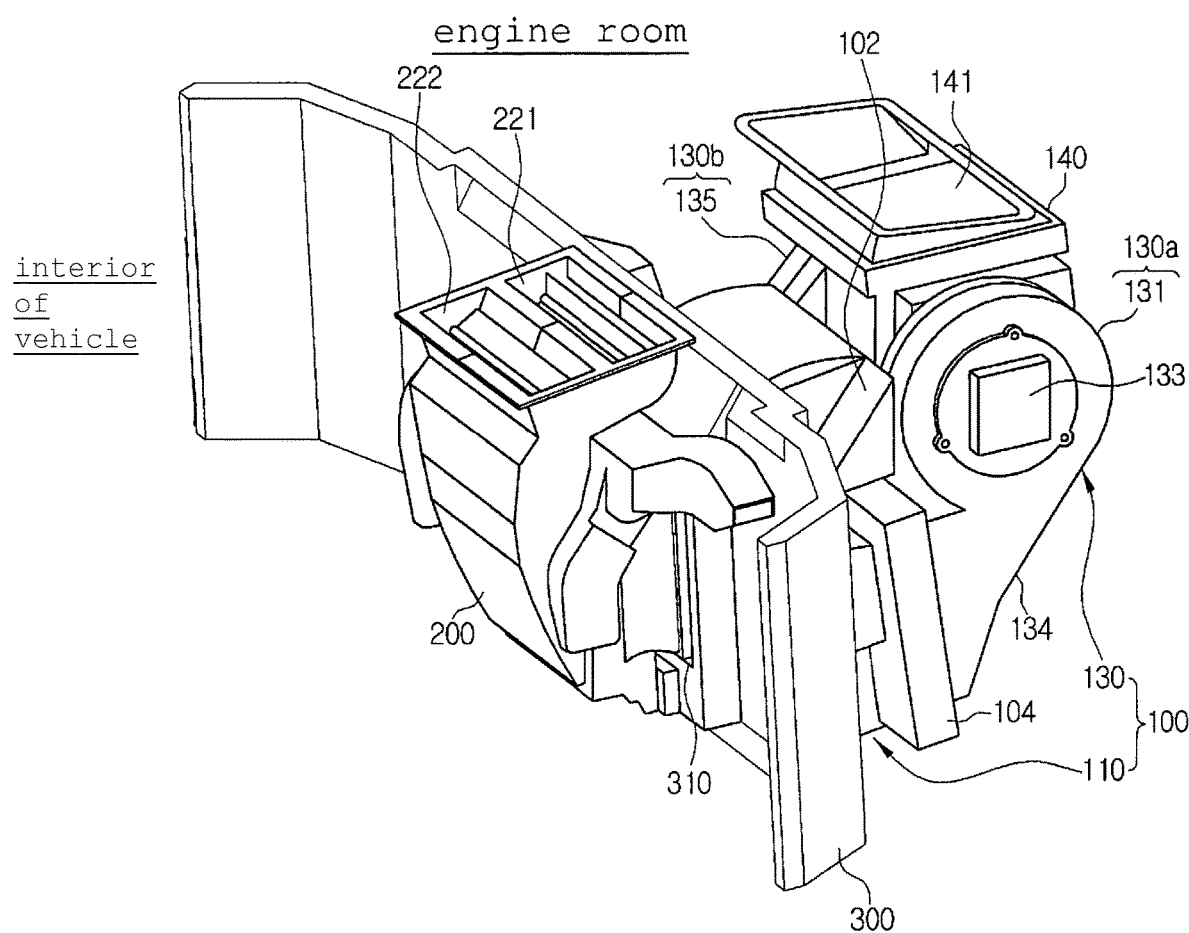
FIG. 3 is a perspective view showing an air conditioning system for a vehicle according to a preferred embodiment of the present invention.
Figure 4:
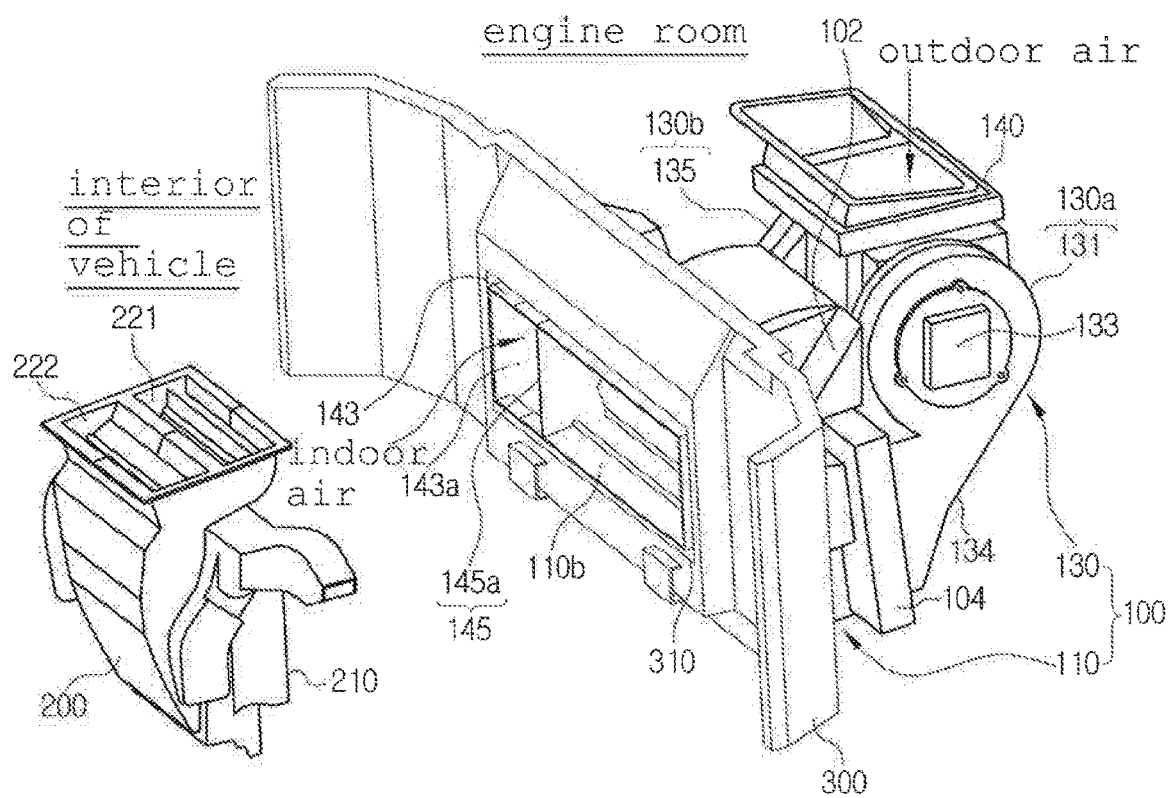
FIG. 4 is a perspective view showing an air conditioning system for a vehicle according to a preferred embodiment of the present invention.
Figure 5:
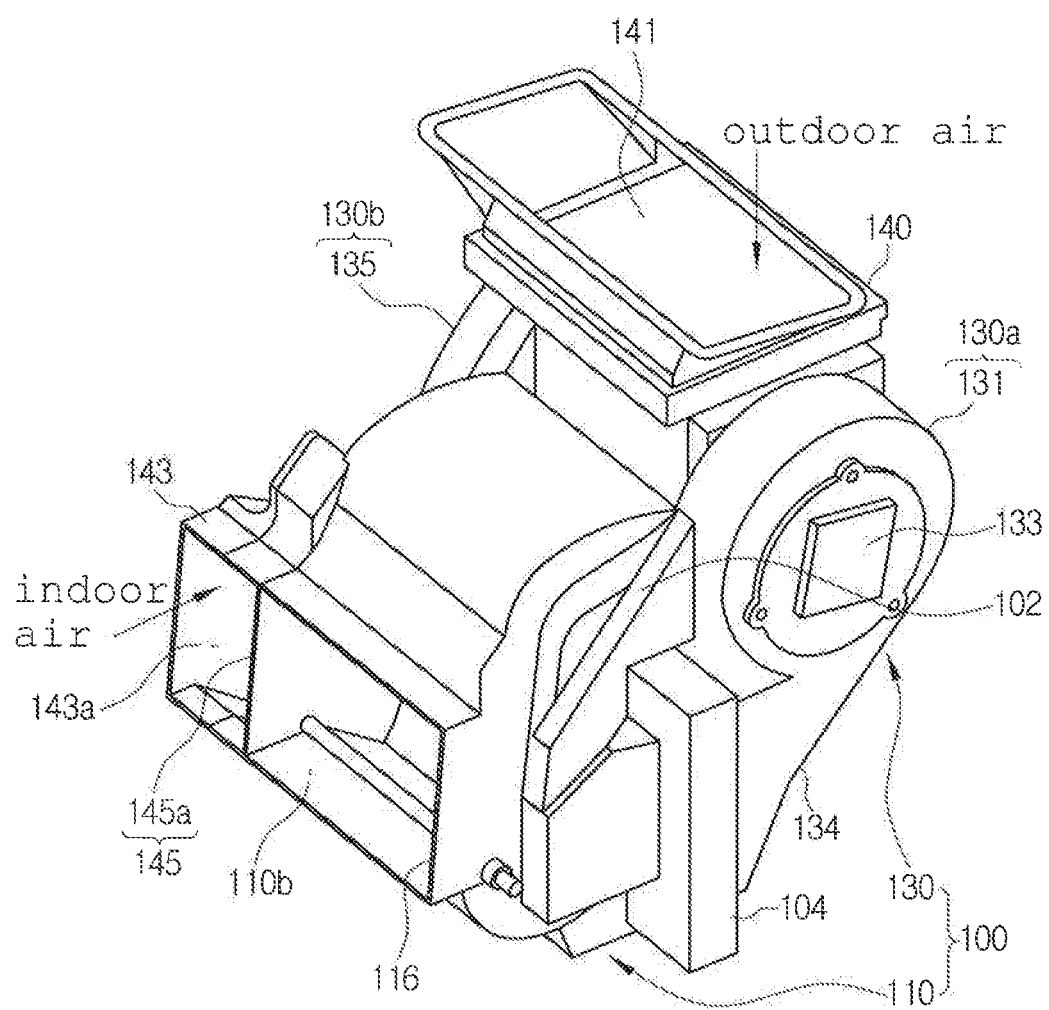
FIG. 5 is a perspective view showing an air-conditioning module of the air conditioning system for the vehicle according to the present invention.
Figure 6:
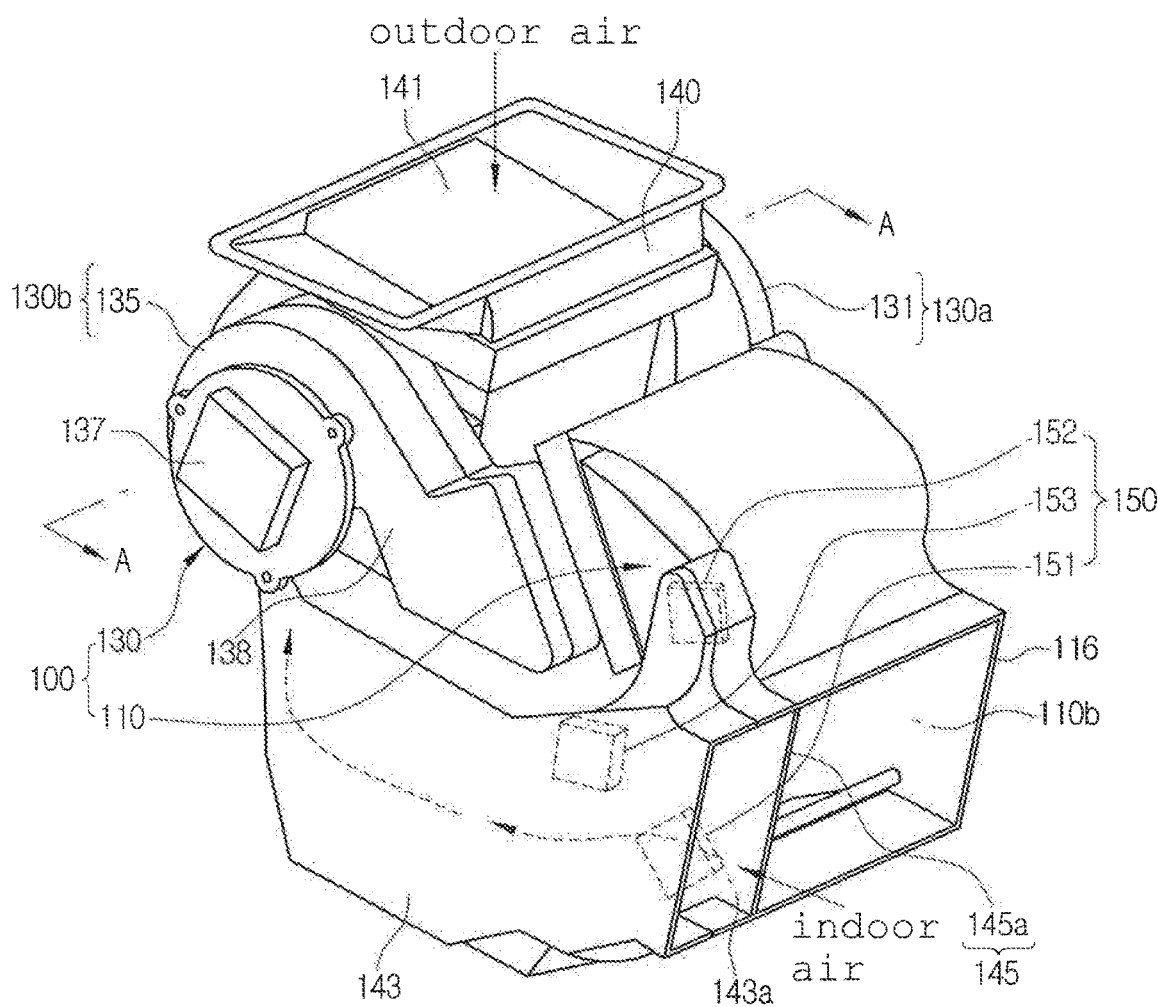
FIG. 6 is a perspective view viewed from an indoor air inflow duct of FIG. 5.
Figure 7:
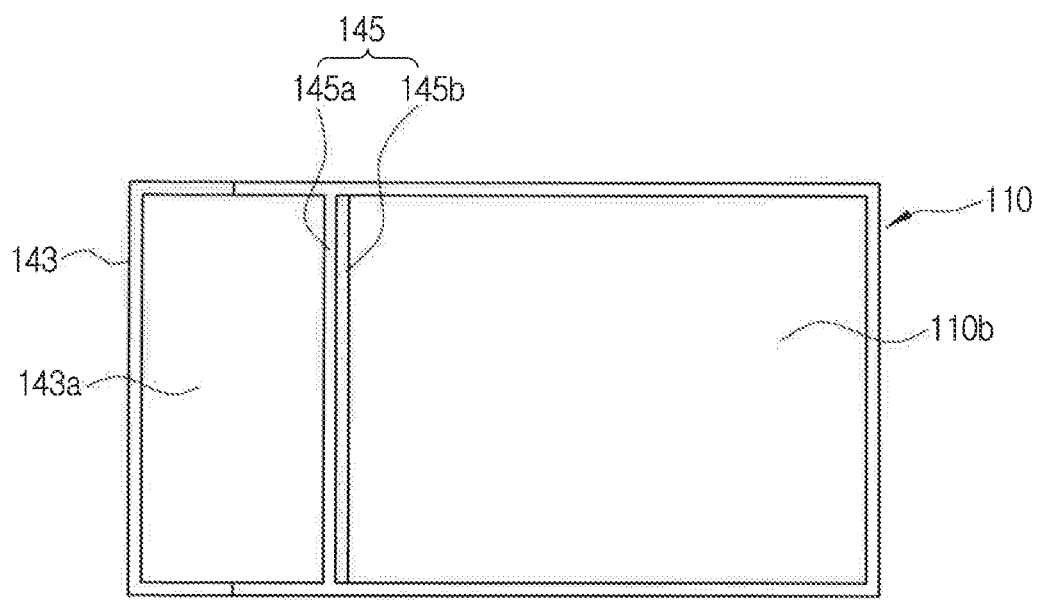
FIG. 7 is a view showing a state where an insulator is mounted by separating means which separates an outlet of an air-conditioning case from an inlet of an indoor air inflow duct in FIG. 6.

Reference will be now made in detail to the preferred embodiment of the present invention with reference to the attached drawings.

As shown in the drawings, an air conditioning system for a vehicle according to the present invention includes a compressor (not shown), a condenser 102, expansion means (not shown) and an evaporator 104, which are connected with one another in order through a refrigerant circulation line (not shown), so as to carry out cooling through the evaporator 104 and carry out heating through the condenser 102.

First, the compressor inhales and compresses vapor-phase refrigerant of low-temperature and low-pressure discharged from the evaporator 104 while operating by receiving a driving force from a power supply, such as an engine or a motor, and then, discharges the refrigerant in a vapor phase of high-temperature and high-pressure.

The condenser 102 exchanges heat between the vapor-phase refrigerant of high-temperature and high-pressure, which is discharged from the compressor and flows inside the condenser 102, and air passing through the condenser 102, and in this instance, the refrigerant is condensed and the air is heated to be changed into warm air. Such a condenser 102 may have a structure that the refrigerant circulation line (refrigerant pipe) is arranged in the form of a zigzag and a radiation fin (not shown) is mounted or a structure that a plurality of tubes (not shown) are stacked up and a radiation fin is mounted between the tubes.

Therefore, the vapor-phase refrigerant of high-temperature and high-pressure discharged from the compressor exchanges heat with the air to be condensed while flowing along the zigzag-shaped refrigerant circulation line or the tubes, and in this instance, the air passing through the condenser 102 is heated to be changed into warm air.

Moreover, the expansion means (not shown) rapidly expands liquid-phase refrigerant, which flows after being discharged from the condenser 102, by throttling effect and sends the expanded refrigerant in a saturated state of low-temperature and low-pressure to the evaporator 104. The expansion means may be an expansion valve or an orifice structure.

The evaporator 104 evaporates the liquid-phase refrigerant of low-pressure, which flows after being discharged from the expansion means, by exchanging heat between the liquid-phase refrigerant and the inside air of the air-conditioning case 110 so as to cool the air due to a heat absorption by an evaporative latent heat of the refrigerant. Continuously, the vapor-phase refrigerant of low-temperature and low-pressure evaporated and discharged from the evaporator 104 is inhaled to the compressor 100 again, and then, recirculates the above-mentioned cycle.

Furthermore, in the above-mentioned refrigerant circulation process, the air blown by a blower unit 130 is introduced into the air-conditioning case 110, is cooled by the evaporative latent heat of the liquid-phase refrigerant circulating inside the evaporator 104, and then, is discharged to the interior of the vehicle in a cooled state through a distribution duct 200, so that the interior of the vehicle is heated. The air blown by the blower unit 130 is introduced into the air-conditioning case 110, is heated by heat radiation of the vapor-phase refrigerant of high-temperature and high-pressure circulating inside the condenser 102 while passing through the condenser 102, and then, is discharged to the interior of the vehicle in a heated state through the distribution duct 200, so that the interior of the vehicle is cooled.

Additionally, the air conditioning system for the vehicle according to the present invention is configured by combination of the air-conditioning module 100 and the distribution duct 200.

The air-conditioning module 100 includes: an air-conditioning case 110 having a cold air passageway 111, on which the evaporator 104 is mounted, a warm air passageway 112, on which the condenser 102 is mounted, and an outlet 110b at which the cold air passageway 111 and the warm air passageway 112 meet together; and the blower unit 130 for blowing air to the cold air passageway 111 and the warm air passageway 112 of the air-conditioning case 110.

The distribution duct 200 includes mode doors 230 which are connected with the outlet 110b of the air-conditioning case 110 to distribute air discharged from the air-conditioning case 110 to a specific position of the interior of the vehicle according to air discharge modes. Moreover, the air-conditioning module 100 and the distribution duct 200 are divided based on a dash panel 300 which partitions the interior of the vehicle from an engine room. That is, the air-conditioning module 100 is arranged at the engine room side based on the dash panel 300 and the distribution duct 200 is arranged at the interior side of the vehicle based on the dash panel 300.

As described above, the air-conditioning module 100 including the air-conditioning case 110, in which the evaporator 104 and the condenser 102 are mounted, and the blower unit 130 is arranged at the engine room side based on the dash panel 300, the distribution duct 200 having the mode doors 230 for distributing air to the interior of the vehicle is arranged at the interior side of the vehicle based on the dash panel 300 to be combined with each other, so that the air conditioning system for the vehicle can reduce noise and vibration in the interior of the vehicle because the air-conditioning module 100, which causes noise, is arranged at the engine room side and can secure an interior space of the vehicle to the maximum compared with the existing air conditioning systems because just the distribution duct 200 is arranged at the interior side of the vehicle.

In addition, the dash panel 300 has a through hole part 310, and as shown in the drawing, just one through hole part 310 is formed in order to combine the air-conditioning module 100 and the distribution duct 200 with each other. Moreover, as shown in the drawing, the through hole part 310 may have a rectangular shape or one of various shapes. If necessary, one or more through hole parts 310 may be formed.

Furthermore, the air-conditioning module 100 arranged at the engine room side and the distribution duct 200 arranged at the interior side of the vehicle are combined with each other through the through hole part 310, namely, are combined and connected with each other at the position of the through hole part 310. In other words, the outlet 110b of the air-conditioning case 110 of the air-conditioning module 100 which penetrates through the through hole part 310 of the dash panel 300 is combined with an air inlet 210 of the distribution duct 200, and in this instance, the air inlet 210 of the distribution duct 200 is inserted into the outlet 110b of the air-conditioning case 110 to be combined.

Furthermore, the cold and warm air passageways 111 and 112 of the air-conditioning case 110 are arranged inside the air-conditioning case 110 in a structure of being put at upper and lower parts of the air-conditioning case 110, and a division wall 113 for dividing the cold air passageway 111 from the warm air passageway 112 is formed inside the air-conditioning case 110. That is, the cold air passageway 111 and the warm air passageway 112 are formed to be arranged at upper and lower parts inside the air-conditioning case 110 by the division wall 113, which divides the inside of the air-conditioning case 110 into an upper part and a lower part.

Now, the structure that the cold air passageway 111 and the warm air passageway 112 are arranged at upper and lower parts inside the air-conditioning case 110 will be described. As shown in the drawing, the cold air passageway 111 is arranged below the division wall 113 and the warm air passageway 112 is arranged above the division wall 113. Of course, not shown in the drawings, the cold air passageway 111 may be arranged above the division wall 113 and the warm air passageway 112 may be arranged below the division wall 113.

In the meantime, the cold air passageway 111 and the warm air passageway 112 are formed in such a way as to be divided from each other at the inlet 110a of the air-conditioning case 110 by the division wall 113 and meet together at the outlet 110b of the air-conditioning case 110. That is, because the division wall 113 is not formed at the outlet 110b of the air-conditioning case 110, the cold air passageway 111 and the warm air passageway 112 are joined together.

Moreover, a bottle neck part 116 whose path gets narrower is formed at the position where the cold air passageway 111 and the warm air passageway 112 are joined together inside the air-conditioning case 110. The bottle neck part 116 is formed at the outlet 110b of the air-conditioning case 110 to which the distribution duct 200 is connected. In this instance, a cross section area of the bottle neck part 116 is smaller than the sum of a cross section area of the outlet 111b of the cold air passageway 111 and a cross section area of the outlet 112b of the warm air passageway 112.

Therefore, cold air flowing the cold air passageway 111 and warm air flowing the warm air passageway 112 meet together at the bottle neck part 116, and in this instance, the cold air and the warm air is compressed and smoothly mixed together while passing through the narrow path of the bottle neck part 116 so that sufficiently mixed air can be discharged out uniformly.

The mixed air while passing through the bottle neck part 116 is mixed again while flowing through the distribution duct 200. Additionally, due to the structure of the bottle neck part 116, the outlet 110b of the air-conditioning case 110 can be designed to be reduced in size, and it causes reduction of the size of the through hole part 310 of the dash panel 300, through which the outlet 110b of the air-conditioning case 110 penetrates, so as to strengthen intensity of the dash panel 300.

Moreover, the evaporator 104 is mounted in the cold air passageway 111, and the condenser 102 is mounted in the warm air passageway 112. Additionally, due to the up-and-down arrangement structure of the warm air passageway 112 and the cold air passageway 111, the condenser 102 and the evaporator 104 are also arranged up and down. In other words, the condenser 102 and the evaporator 104 are arranged at right angles to the axial direction that rotary shafts of motors 133 and 137 of first and second blowers 130a and 130b, which will be described later, face. Meanwhile, cold air flows toward the cold air passageway 111 in which the evaporator 104 is mounted, and warm air flows toward the warm air passageway 112 in which the condenser 102 is mounted.

Furthermore, a bypass passageway 115 is formed to penetrate the division wall 113 formed between the evaporator 104 and the condenser 102 to communicate the cold air passageway 111 and the warm air passageway 112 with each other, and a bypass door 115 is mounted on the bypass passageway 114 to open and close the bypass passageway 114.

The bypass passageway 114 bypasses some of the cold air passing through the evaporator 104 inside the cold air passageway 111 toward the warm air passageway 112, and the bypass door 115 closes the bypass passageway 114 in the cooling mode but selectively opens and closes the bypass passageway 114 in the heating mode.

Therefore, in a state where the bypass door 115 closes the bypass passageway 114, in the cooling mode, the cold air cooled by the evaporator 1004 while flowing inside the cold air passageway 111 is supplied to the interior of the vehicle to carry out cooling, and the air flowing inside the warm air passageway 112 is released out. In the heating mode, the warm air heated by the condenser 102 while flowing inside the warm air passageway 112 is supplied to the interior of the vehicle to carry out heating, and in this instance, the air flowing inside the cold air passageway 111 is released out.

Furthermore, when dehumidification is needed during the heating mode, namely, the bypass door 115 opens the bypass passageway 114. In this instance, some of the air cooled and dehumidified by the evaporator 104 while flowing inside the cold air passageway 111 is bypassed toward the warm air passageway 112 through the bypass passageway 114, and then, is supplied to the interior of the vehicle to carry out dehumidification and heating.

Additionally, the condenser 102 is mounted at the streamside lower than the bypass passageway 114. Therefore, the cold air heated while passing through the evaporator 104 can be supplied to the condenser 102 through the bypass passageway 114. In the meantime, the evaporator 104 is mounted at the streamside higher than the bypass passageway 114 in an air flow direction inside the cold air passageway 111.

In addition, at one side of the cold air passageway 111 of the air-conditioning case 110, disposed are a cold air discharge port 119a for discharging the cold air passing through the evaporator 104 to the outside and a cold air mode door 120 for opening and closing the cold air discharge port 119a and the cold air passageway 111. Moreover, at one side of the warm air passageway 112 of the air-conditioning case 110, disposed are a warm air discharge port 119b for discharging the warm air passing through the condenser 102 to the outside and a warm air mode door 121 for opening and closing the warm air discharge port 119b and the warm air passageway 112.

The cold air discharge port 119a and the cold air mode door 120 is disposed at the downstream side of the evaporator 104 in the cold air passageway 111, and the warm air discharge port 119b and the warm air mode door 121 is disposed at the downstream side of the condenser 102 in the warm air passageway 112. The air discharged through the cold air discharge port 119a and the warm air discharge port 119b is discharged to the outside of the vehicle through the engine room.

Therefore, in the cooling mode, the cold air mode door 120 opens the cold air passageway 111 and the warm air mode door 121 opens the warm air discharge port 119b, so that the air flowing through the cold air passageway 111 is cooled while passing through the evaporator 104. After that, the cooled air is discharged to the interior of the vehicle through the distribution duct 200 to cool the interior of the vehicle, and in this instance, the air flowing the warm air passageway 112 is heated while passing through the condenser 102, and then, is discharged to the outside through the warm air discharge port 119b.

In the heating mode, the warm air mode door 121 opens the warm air passageway 121 and the cold air mode door 120 opens the cold air discharge port 119a, so that the air flowing the warm air passageway 112 is heated while passing through the condenser 102. After that, the heated air is discharged to the interior of the vehicle through the distribution duct 200, and in this instance, the air flowing the cold air passageway ill is cooled while passing through the evaporator 104, and then, is discharged to the outside through the cold air discharge port 119a. Additionally, the blower unit 130 for blowing air to the cold air passageway 111 and the warm air passageway 112 is mounted at the inlet 110a of the air-conditioning case 110.

The air blower 130 includes: a first blower 130a for blowing air toward the cold air passageway 111 through a discharge port 134 connected to the inlet 111a of the cold air passageway 111 of the air-conditioning case 110; and a second blower 130b for blowing air toward the warm air passageway 112 through a discharge port 138 connected to the inlet 112a of the warm air passageway 112 of the air-conditioning case 110. The first blower 130a and the second blower 130b are arranged to be spaced apart from each other and opposed to each other in the width direction of the vehicle.

The first blower 130a includes: a scroll case 131 having the discharge port 134 to be connected to the inlet 111a of the cold air passageway 111 of the air-conditioning case 110; a blast fan 132 rotatably mounted inside the scroll case 131; an inlet ring 131a which is formed on one side of the scroll case 131 to introduce indoor air and outdoor air; and a motor 133 which is mounted on the other side of the scroll case 131 to rotate the blast fan 132. The inlet ring 131a is formed on the one side of the scroll case 131 to which an intake duct 140 is located.

The second blower 130b includes: a scroll case 135 having the discharge port 138 to be connected to the inlet 112a of the warm air passageway 112 of the air-conditioning case 110; a blast fan 136 rotatably mounted inside the scroll case 135; an inlet ring 135a which is formed on one side of the scroll case 135 to introduce indoor air and outdoor air; and a motor 137 which is mounted on the other side of the scroll case 135 to rotate the blast fan 136. The inlet ring 135a is formed on the one side of the scroll case 135 to which an intake duct 140 is located.

The first blower 130a and the second blower 130b are mounted in such a way that rotary shafts of the motors 133 and 1377 are in the same direction. Furthermore, the inlet ring 131a of the first blower 130a and the inlet ring 135a of the second blower 130b are formed to be opposed to each other. Meanwhile, the scroll cases 131 and 135 of the first and second blowers 130a and 130b are formed in a scroll type around the blast fans 132 and 136 mounted inside the blowers 130a and 130b. Therefore, cross section areas of air passageways around the blast fans 132 and 136 inside the scroll cases 131 and 135 get gradually larger from a start point to an end point of a scroll. Moreover, the discharge ports 134 and 138 of the first and second blowers 130a and 130b respectively extend from the end points of the scroll of the scroll cases 131 and 135 and are respectively connected with the cold air passageway 111 and the warm air passageway 112.

In the meantime, the scroll case 131 of the first blower 130a and the scroll case 135 of the second blower 130b are mounted in such a way that scroll directions are opposite to each other, so that the scroll case 131 of the first blower 130a is connected with the cold air passageway 111 located below the division wall 113 and the scroll case 135 of the second blower 130b is connected with the warm air passageway located above the division wall 113.

Furthermore, an intake duct 140 which is connected with the first and second blowers 130a and 130b to be communicated with each other is mounted between the first blower 130a and the second blower 130b so as to supply indoor air and outdoor air to the first and second blowers 130a and 130b. That is, one intake duct 140 is mounted between the first blower 130a and the second blower 130b, so that the first and second blowers 130a and 130b can commonly use the one intake duct 140.

As described above, because the intake duct 140 is mounted between the first blower 130a and the second blower 130b, the system using the two blowers 130a and 130b which are operated individually uses just one intake duct 140 so as to maximize space efficiency and reduce the size and manufacturing costs of the system.

The intake duct 140 includes: an outdoor air inlet 141 for introducing outdoor air; an indoor air inlet 142 for introducing indoor air; a first indoor and outdoor air converting door 147 which is mounted to open and close a passageway for communicating the indoor air inlet 142, the outdoor air inlet 141 and the first blower 130a to selectively introduce indoor air and outdoor air toward the first blower 130a; and a second indoor and outdoor air converting door 148 which is mounted to open and close a passageway for communicating the indoor air inlet 142, the outdoor air inlet 141 and the second blower 130b to selectively introduce indoor air and outdoor air toward the second blower 130b.

In other words, the first indoor and outdoor air converting door 147 is mounted at the upstream side of the inlet ring 131a of the first blower 130a between the outdoor air inlet 141 and the indoor air inlet 142 in order to selectively open and close a passageway for communicating the inlet ring 131a and the outdoor air inlet 141 with each other and a passageway for communicating the inlet ring 131a and the indoor air inlet 142 with each other. The second indoor and outdoor air converting door 148 is mounted at the upstream side of the inlet ring 135a of the second blower 130b between the outdoor air inlet 141 and the indoor air inlet 142 in order to selectively open and close a passageway for communicating the inlet ring 135a and the outdoor air inlet 141 with each other and a passageway for communicating the inlet ring 135a and the indoor air inlet 142 with each other.

Meanwhile, preferably, the outdoor air inlet 141 is formed at an upper part of the intake duct 140 and the indoor air inlet 142 is formed at a lower part of the intake duct 140, but positions of the outdoor air inlet 141 and the indoor air inlet 142 may be varied. The first indoor and outdoor air converting door 147 and the second indoor and outdoor air converting door 148 are also formed in a dome-shaped door. As described above, because one intake duct 140 is mounted between the first blower 130a and second blower 130b and the first and second indoor and outdoor air converting doors 147 and 148 are mounted inside the intake duct 140, indoor air and outdoor air introduced into the indoor air inlet 142 and the outdoor air inlet 141 of the intake duct 140 can be selectively supplied to the first and second blowers 130a and 130b.

In the meantime, air filters 141a and 141b are respectively mounted on the outdoor air inlet 141 and the indoor air inlet 142 so as to remove impurities contained in the air introduced into the outdoor air inlet 141 and the indoor air inlet 142. Furthermore, the outdoor air inlet 141 of the intake duct 140 communicates with the outside of the vehicle, and the indoor air inlet 142 of the intake duct 140 communicates with the interior of the vehicle. In this instance, an indoor air inflow duct 143 which connects the indoor air inlet 142 of the blower unit 130 with the interior of the vehicle is mounted on the air-conditioning case 110 in order to supply the indoor air of the interior of the vehicle to the blower unit 130.

That is, the indoor air inflow duct 143 is mounted on the outer face of the air-conditioning case 110 to connect the indoor air inlet 142 of the intake duct 140 with the interior of the vehicle, and in this instance, an inlet 143a of the indoor air inflow duct 143 penetrates through the dash panel 300 and is connected with the interior of the vehicle. Additionally, the outlet 110b of the air-conditioning case 110 and the inlet 143a of the indoor air inflow duct 143 are arranged to be adjacent to each other. In this instance, the outlet 110b of the air-conditioning case 110 and the inlet 143a of the indoor air inflow duct 143 may be separated from each other by separating means 145. In addition, the outlet 110b of the air-conditioning case 110 and the inlet 143a of the indoor air inflow duct 143 are arranged to penetrate through the through hole part 310 of the dash panel 300.

As described above, because the outlet 110b of the air-conditioning case 110 and the inlet 143a of the indoor air inflow duct 143 are formed to be adjacent to each other and penetrate through the through hole part 310 of the dash panel 300, the air conditioning system can be installed in the vehicle just through the one through hole 310 formed in the dash panel 300, thereby enhancing assemblability and reducing weight and the installation cost. Moreover, just through the one through hole 310 formed in the dash panel 300, because the air-conditioning module 100 can be arranged at the engine room side and the distribution duct 200 can be arranged inside the vehicle, the air conditioning system for the vehicle according to the present invention can reduce noise and vibration and maximize the interior space of the vehicle.

The inlet 143a of the indoor air inflow duct 143 and the outlet 110b of the air-conditioning case 110 are arranged side by side to penetrate through the through hole part 310. Because the inlet 143a of the indoor air inflow duct 143 and the outlet 110b of the air-conditioning case 110 are arranged side by side to penetrate through the through hole part 310, the one through hole part 310 is formed in the dash panel 300 for installation of the air conditioning system.

Figure 13:
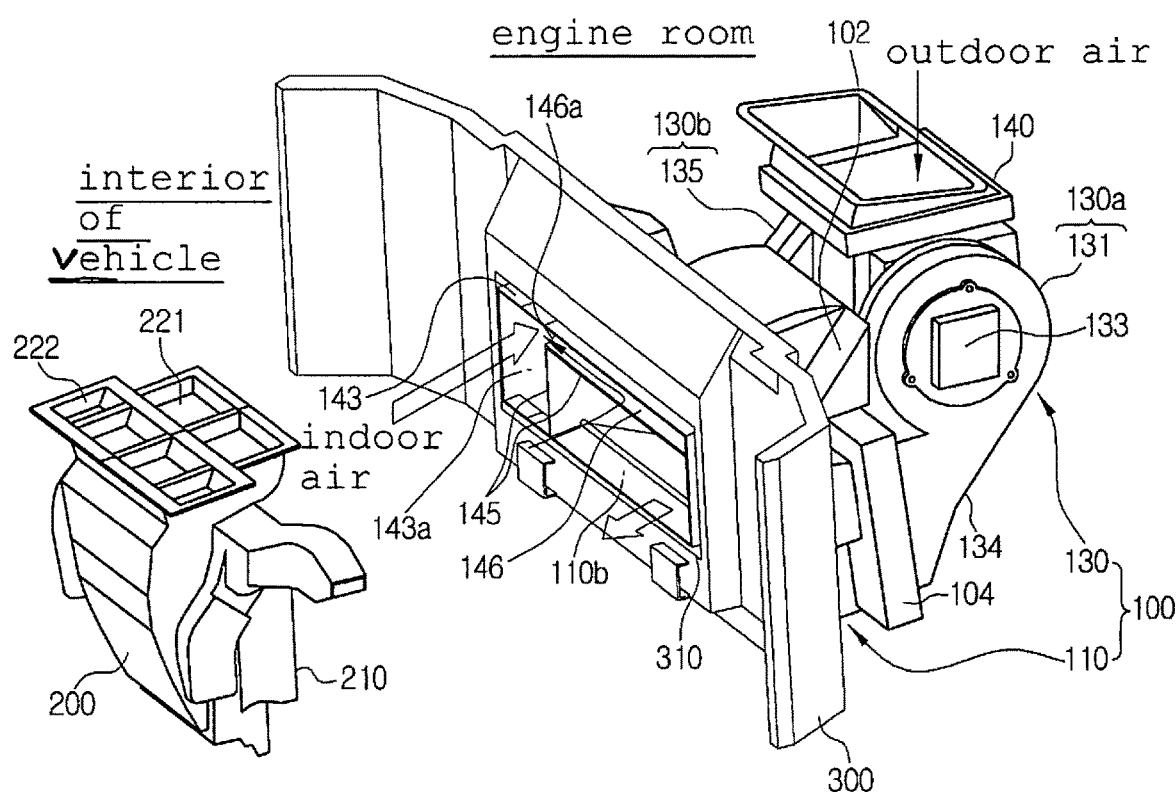
FIG. 13 is a perspective view showing the mixing mode of the air conditioning system for the vehicle according to the present invention.
Figure 14:
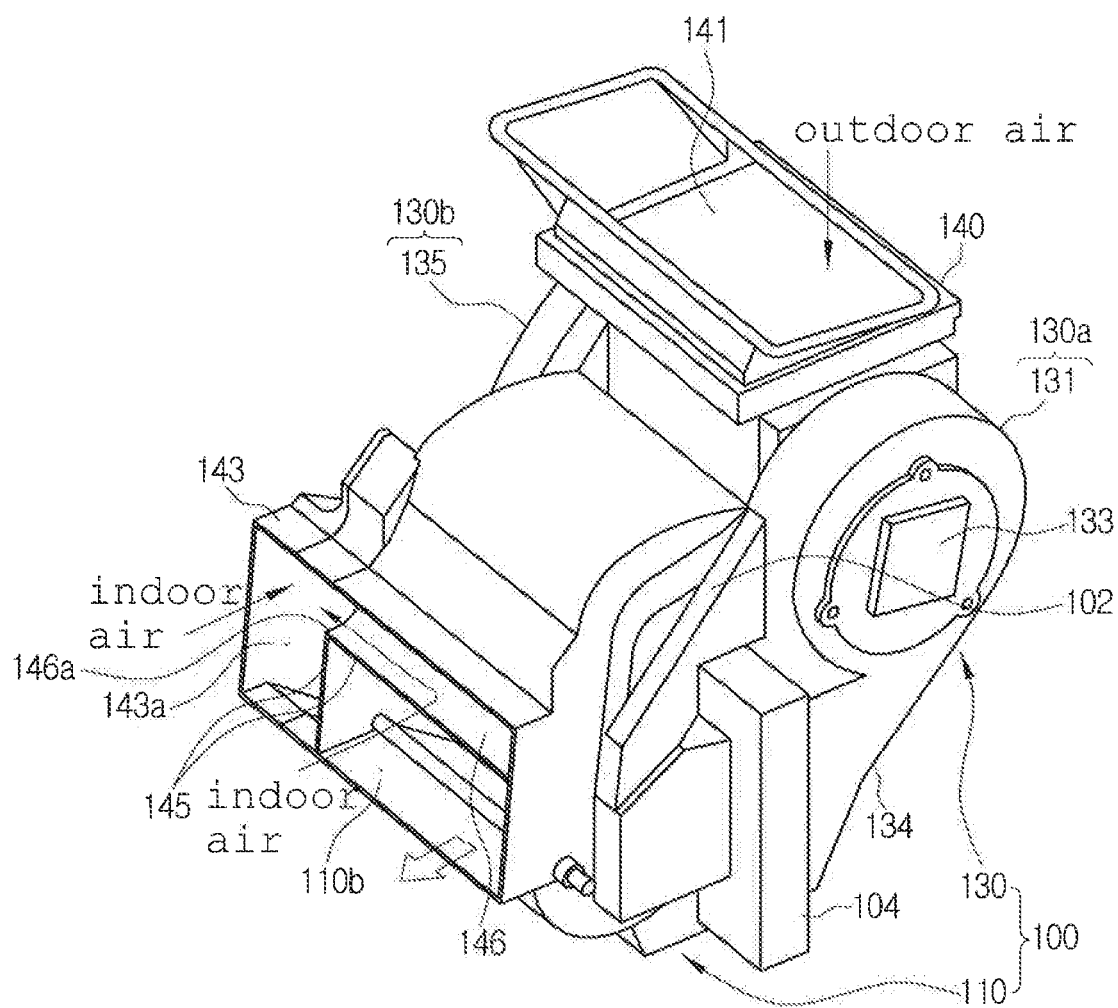
FIG. 14 is a perspective view seen from the indoor air inflow duct of FIG. 13.
Figure 15:
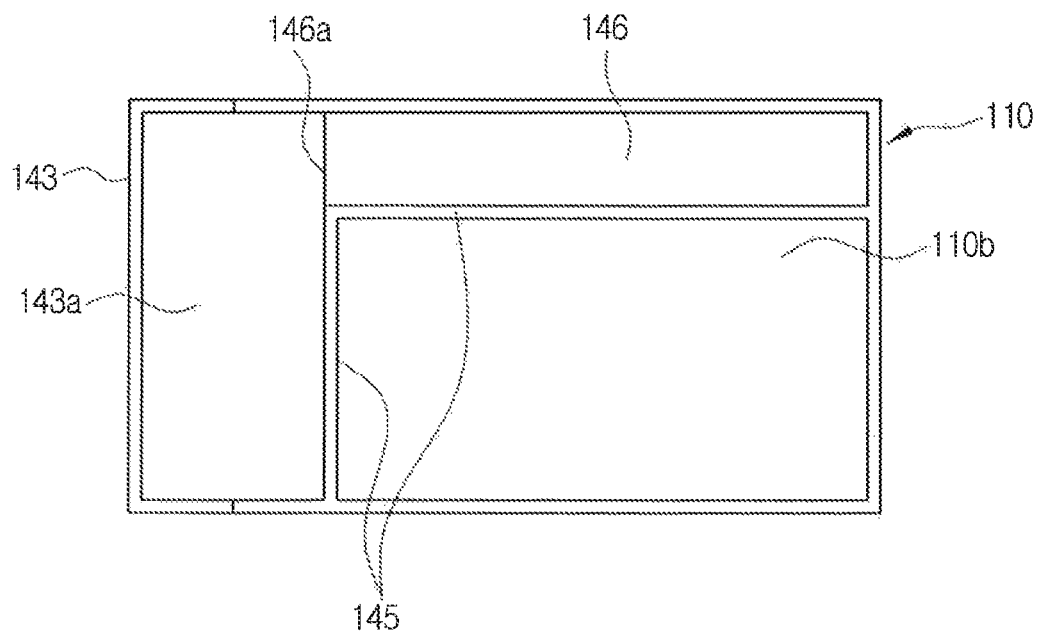
FIG. 15 is a view showing the outlet side of the air-conditioning case of FIG. 14.

Meanwhile, referring to FIGS. 13 to 15, an auxiliary indoor air intake hole 146 may be formed at one side of the air-conditioning case in order to additionally inhale the indoor air to the indoor air inflow duct 143. The auxiliary indoor air intake hole 146 is formed in a dead zone between the outlet 110b of the air-conditioning case 110 and the outside of the inlet 143a of the indoor air inflow duct 143 in one side of the air-conditioning case 110.

That is, the outlet 110b of the air-conditioning case 110 has a proper size (width×height) according to the cold air passageway 111 and the warm air passageway 112 inside the air-conditioning case 110. Hence, the height of the outlet 110b of the air-conditioning case 110 is different from the height of the inlet 143a of the indoor air inflow duct 143, and as shown in the drawings, the height of the outlet 110b of the air-conditioning case 110 is smaller than the height of the inlet 143a of the indoor air inflow duct 143.

Due to such a difference in height between the outlet 110b of the air-conditioning case 110 and the inlet 143a of the indoor air inflow duct 143, the dead zone is formed at one side of the air-conditioning case 110, and the auxiliary indoor air intake hole 146 is formed in the dead zone excepting the outlet 110b of the air-conditioning case 110 and the inlet 143a of the indoor air inflow duct 143.

In the meantime, some of the through hole part 310 formed in the dash panel 300 is used as the outlet 110b of the air-conditioning case 110, some of the through hole part 310 is used as the inlet 143a of the indoor air inflow duct 143, and some of the through hole part 310 is used as the auxiliary indoor air intake hole 146. Furthermore, the outlet 110b and the auxiliary indoor air intake hole 146 of the air-conditioning case 110 are arranged in the up-and-down direction, and the outlet 110b of the air-conditioning case 110 and the inlet 143a of the indoor air inflow duct 143 are arranged in the right-and-left direction.

As shown in the drawings, the sum of the height of the outlet 110b of the air-conditioning case 110 and the height of the auxiliary indoor air intake hole 146 is equal to the height of the inlet 143a of the indoor air inflow duct 143. Additionally, because the indoor air inflow duct 143 is assembled to the side of the air-conditioning case 110, the cold air passageway 111 and the warm air passageway 112 formed inside the air-conditioning case 110 and the indoor air inflow duct 143 mounted on the outer face of the air-conditioning case 110 are partitioned from each other, and in this instance, the outlet 110b of the air-conditioning case 110, the inlet 143a of the indoor air inflow duct 143 and the auxiliary indoor air intake hole 146 are partitioned from one another by a partition wall 145a.

In the meantime, the air discharged from the air-conditioning case 110 and the indoor air which is introduced into the indoor air inflow duct 143 and flows to the blower unit 130 are completely separated from each other by the partition wall 145a, the auxiliary indoor air intake hole 146 is also completely separated from the outlet 110b of the air-conditioning case 110. In addition, a connection hole 146a which connects the inlet 143a of the indoor air inflow duct 143 and the auxiliary indoor air intake hole 146 with each other is formed in the partition wall 145a between the inlet 143a of the indoor air inflow duct 143 and the auxiliary indoor air intake hole 146.

That is, because the inlet 143a of the indoor air inflow duct 143 and the auxiliary indoor air intake hole 146 are communicated with each other through the connection hole 146a of the partition wall 145a, when the first and second blowers 130a and 130b are operated, indoor air is inhaled through the inlet 143a of the indoor air inflow duct 143 and the auxiliary indoor air intake hole 146, so that an indoor air intake area is increased within a limited installation space and cooling performance is improved through an increase of air volume in an indoor air mode. Moreover, because the indoor air intake area is increased, the air conditioning system for the vehicle according to the present invention can reduce indoor air intake noise of the first and second blowers 130a and 130b and also reduce consumption power of the blowers due to reduction of intake static pressure of the first and second blowers 130a and 130b.

Meanwhile, because the outlet 110b of the air-conditioning case 110, the inlet 143a of the indoor air inflow duct 143 and the auxiliary indoor air intake hole 146 are arranged to be adjacent with one another and the one through hole part 310 is formed in the dash panel 300, the air conditioning system for the vehicle according to the present invention can secure rigidity of the dash panel 300 and enhance assemblability.

Furthermore, electronic units 150 are disposed outside the air-conditioning case 110 to control the air-conditioning module 100. The electronic units 150 are mounted inside the indoor air inflow duct 143. That is, the indoor air inflow duct 143 serves as a cover for dividing the electronic units 150 from the outside. As described above, because the electronic units 150 are disposed outside the air-conditioning case 110 and inside the indoor air inflow duct 143 in such a way that the electronic units 150 are separated from the outside, so that the air conditioning system can reduce a failure rate of the electronic units 150 and extend the lifespan by preventing dust and moisture which will be introduced into the electronic units 150.

The electronic units 150 are respectively mounted on the outer face of the air-conditioning case 110 corresponding to positions of the cold air mode door 120, the warm air mode door 121 and the bypass door 115, and include an actuator 151 for actuating the cold air mode door 120, an actuator 152 for actuating the warm air mode door 121 and an actuator 153 for actuating the bypass door 115. Meanwhile, not shown in the drawings, but, besides the actuators, the electronic units 150 may be ionizers, evaporator sensors, duct sensors, electric connectors and others.

Furthermore, the separating means 145 has the partition wall 145a formed between the outlet 110b of the air-conditioning case 110 and the inlet 143a of the indoor air inflow duct 143. The partition wall 145a separates the cold and warm air passageways 111 and 112 of the air-conditioning case 110 from the indoor air inflow duct 143. Therefore, the air discharged from the air-conditioning case 110 is completely separated from the indoor air, which is introduced into the indoor air inflow duct 143 and flows to the blower unit 130, by the partition wall 145a.

Additionally, an insulator 145b is mounted at one side of the partition wall 145a to prevent heat exchange between the air flowing the air-conditioning case 110 and the indoor air flowing the indoor air inflow duct 143.

Figure 8:
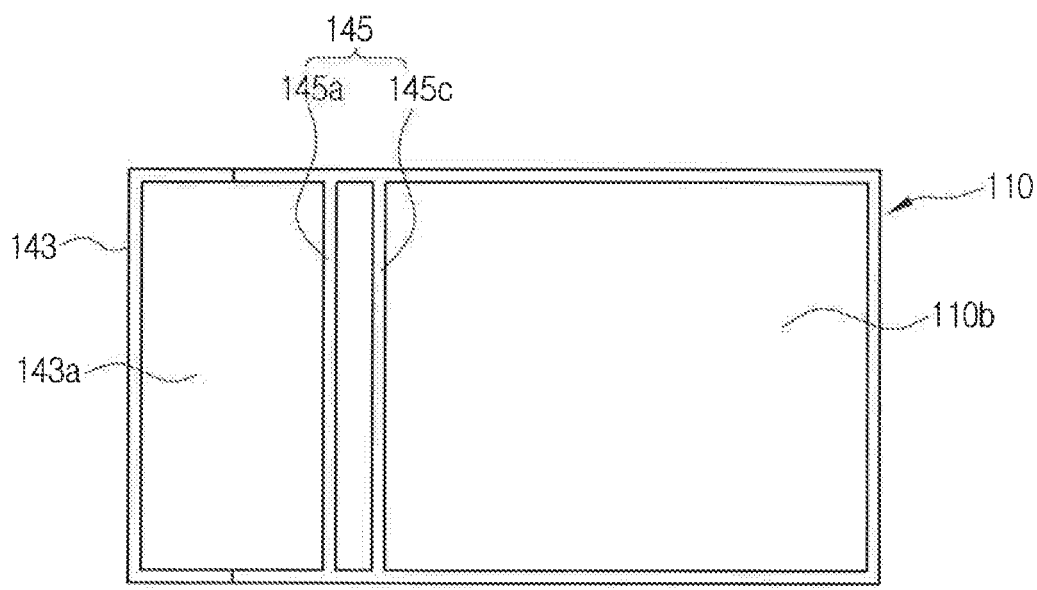
FIG. 8 is a view showing another example of the separating means.
Figure 9:
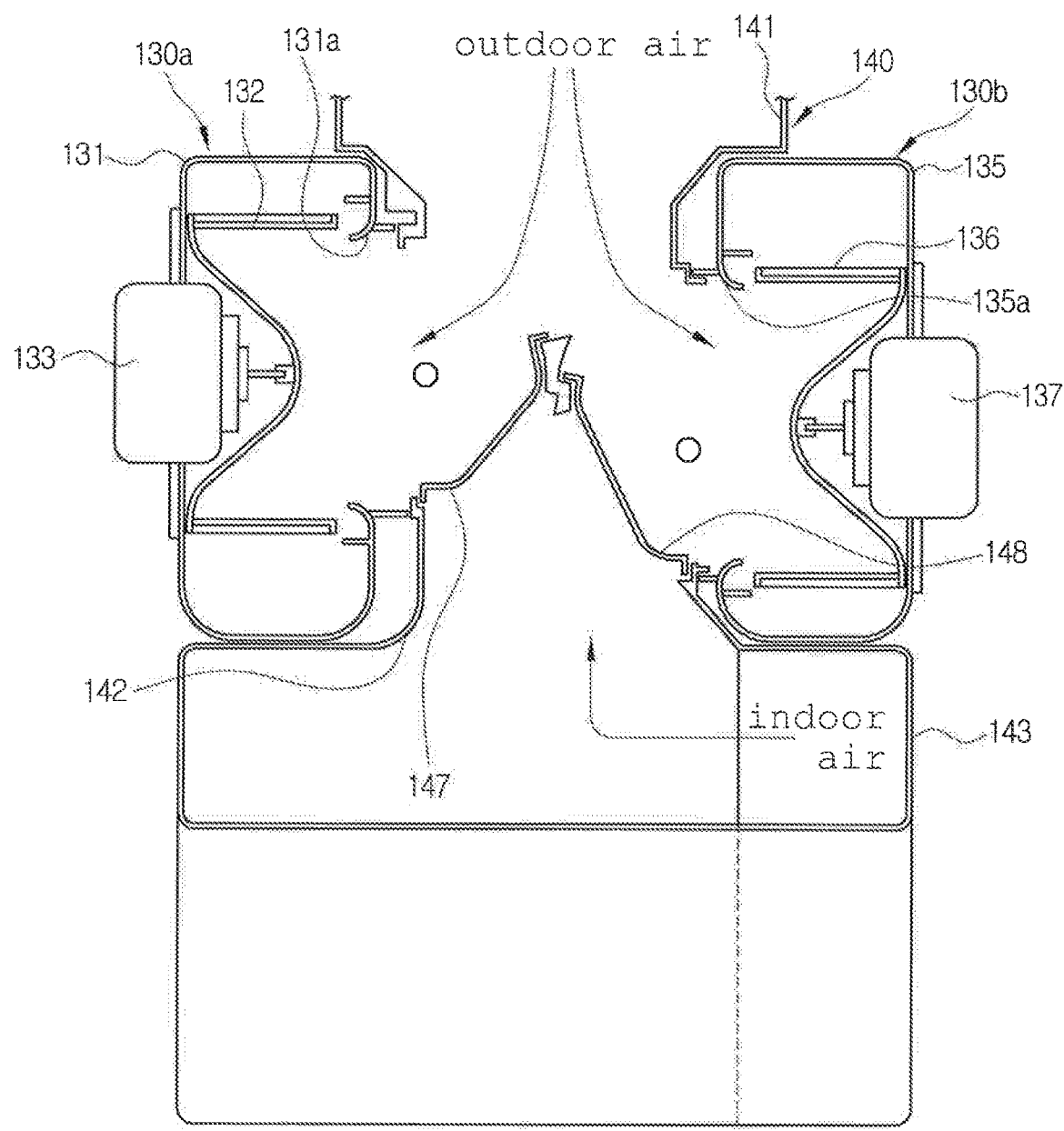
FIG. 9 is a sectional view taken along the line A-A of FIG. 6.

In addition, as another preferred embodiment of the separating means 145, as shown in FIG. 8, a plurality of partition walls 145a and 145c may be formed between the outlet 110b of the air-conditioning case 110 and the inlet 143a of the indoor air inflow duct 143 to be spaced apart from each other. In this instance, an insulator or a buffering member may be mounted between the partition walls 145a and 145c or an empty space may be formed between the partition walls 145a and 145c.

Moreover, the distribution duct 200 includes: an air inflow port 210 connected with the outlet 110b of the air-conditioning case 110; a plurality of air outflow ports 220 for distributing air introduced into the air inflow port 210 to specific positions of the interior of the vehicle; and the mode doors 230 for controlling the degree of opening of the air outflow ports 220.

The air outflow ports 220 are a defrost vent 221 and a face vent 222 which are partitioned from each other at an upper part of the distribution duct 200, and a floor vent 223 which is formed to be adjacent to the dash panel 300. In this instance, for a passenger's comfort in the interior of the vehicle, the floor vent 223 discharges air which is warmer than that of the face vent 222, and the face vent 222 discharges air which is colder than that of the floor vent 223. Because warm air flows above the division wall 113 inside the air-conditioning case 110 and cold air flows below the division wall 113, the floor vent 223 is formed adjacent to the dash panel 300 so as to be close to the passageway in which the warm air flows.

Figure 12:
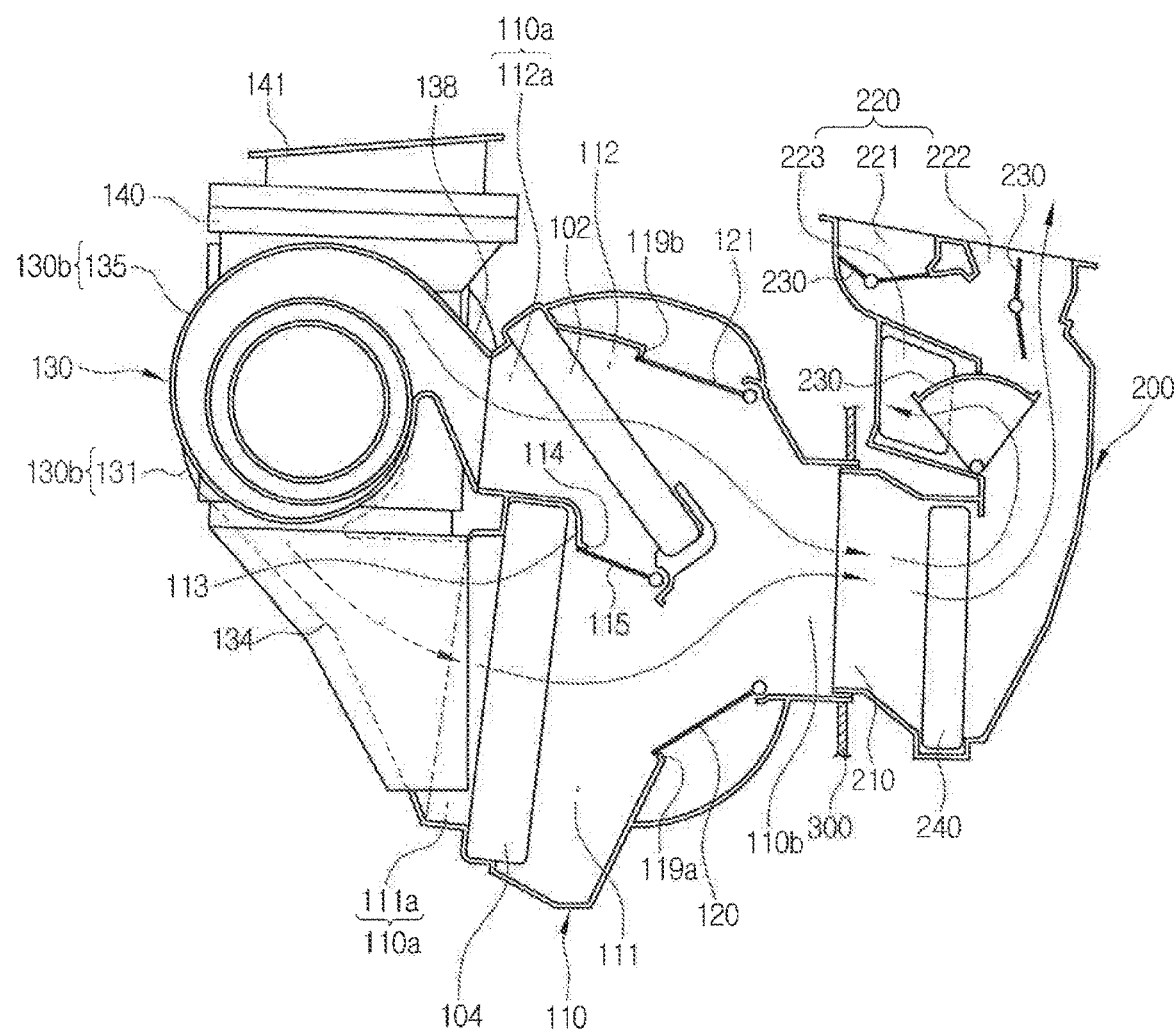
FIG. 12 is a sectional view showing a mixing mode of the air conditioning system for the vehicle according to the present invention.

In other words, in case of the existing air conditioning system, the floor vent is formed not to be adjacent to the dash panel 300 but to be far from the dash panel 300. However, in the distribution duct 200 of the present invention, the floor vent 223 is formed adjacent to the dash panel 300. Therefore, as shown in FIG. 12, the warm air flowing along the warm air passageway 112 in the upper part of the air-conditioning case 110 and the cold air flowing along the cold air passageway 111 in the lower part of the air-conditioning case 110 are mixed together while being introduced into the distribution duct 200, but warmer air is discharged through the floor vent 223, which is close to the warm air in an aspect of the flow of air, and colder air is discharged through the face vent 222, which is close to the cold air, so as to enhance the passenger's comfort in the interior of the vehicle.

Meanwhile, the defrost vent 221 discharges air toward the front window of the interior of the vehicle, the face vent 222 discharges air toward the face of the passenger who is sitting on the front seat of the vehicle, and the floor vent 223 discharges air toward the passenger's feet. Furthermore, the mode doors 230 are respectively mounted at the defrost vent 221, the face vent 222 and the floor vent 223 to control the degrees of opening of the vents according to the air discharge modes. In the meantime, an electric heater 240 may be mounted inside the distribution duct 200.

Meanwhile, the outlet 110b of the air-conditioning case 110 and the inlet 143a of the indoor air inflow duct 143 may be arranged to be spaced apart from each other. That is, the outlet 110b of the air-conditioning case 110 and the inlet 143a of the indoor air inflow duct 143 may be arranged to be alongside each other or to be spaced apart from each other at a predetermined distance.

Hereinafter, a refrigerant flowing process of the air conditioning system for the vehicle according to the present invention will be described. First, the vapor-phase refrigerant of high-temperature and high-pressure discharged after being compressed in the compressor is introduced into the condenser 102. The vapor-phase refrigerant introduced into the condenser 102 exchanges heat with the air passing through the condenser 102, and in the above process, the refrigerant is liquefied while being cooled. The liquid-phase refrigerant discharged from the condenser 102 is introduced into the expansion means to be decompressed and expanded.

The refrigerant decompressed and expanded in the expansion means becomes an atomized state of low-temperature and low-pressure and is introduced into the evaporator 104. The refrigerant introduced into the evaporator 104 exchanges heat with the air passing through the evaporator 104 to be evaporated. After that, the refrigerant of low-temperature and low-pressure discharged from the evaporator 104 is introduced into the compressor, and then, recirculates the above-mentioned refrigeration cycle.

Hereinafter, air flow processes in the cooling mode, in the heating mode and in the mixing mode will be described.

A. Cooling Mode

Figure 10:
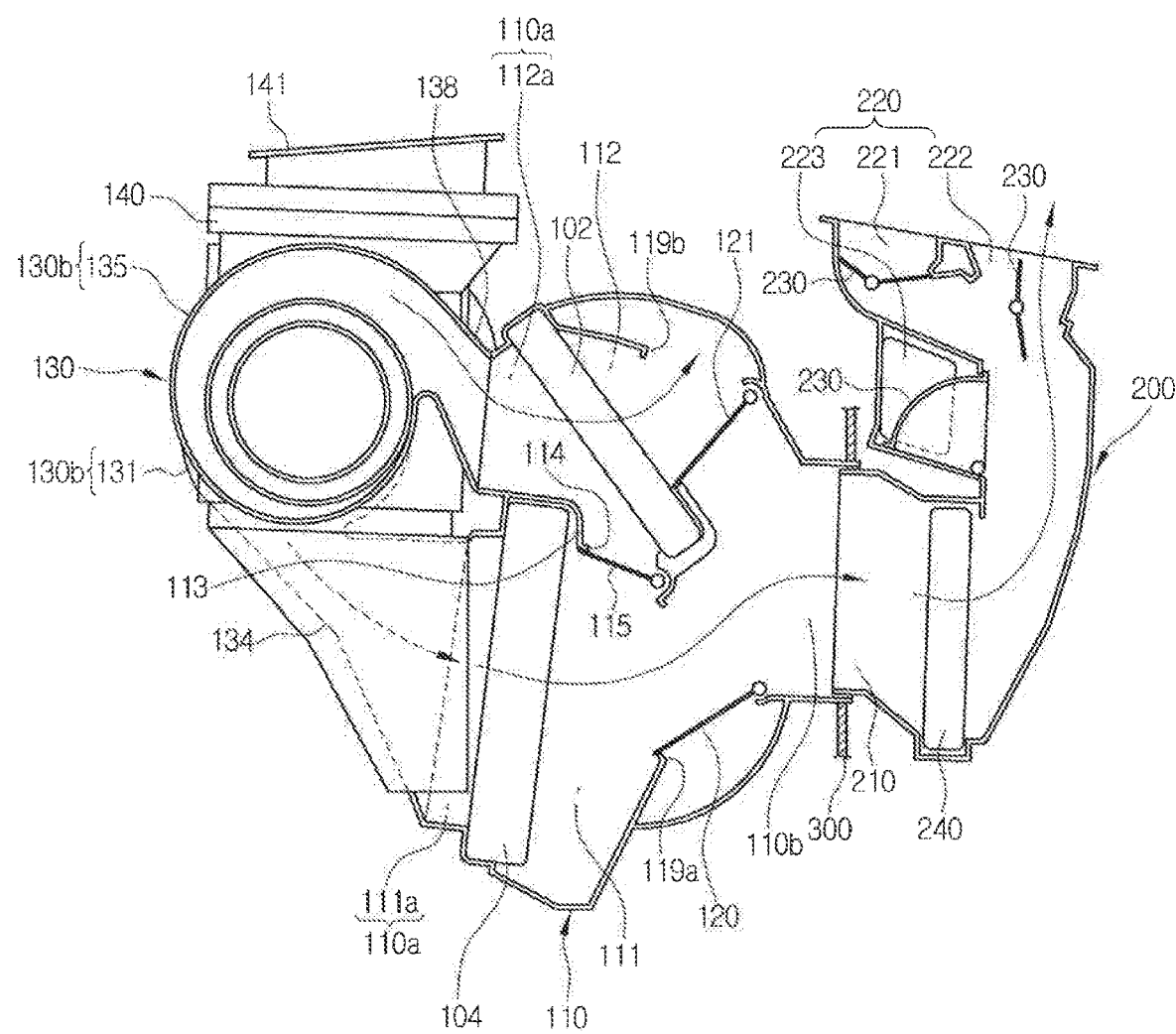
FIG. 10 is a sectional view showing a cooling mode of the air conditioning system for the vehicle according to the present invention.

In the cooling mode, as shown in FIG. 10, the cold air mode door 120 is operated to open the cold air passageway 111, and the warm air mode door 121 is operated to open the warm air discharge port 119b. Additionally, the first and second indoor and outdoor air converting doors 147 and 148 are operated according to the indoor air inflow mode or the outdoor air inflow mode to selectively supply indoor air or outdoor air toward the first and second blowers 130a and 130b.

Therefore, when the first and second blowers 130a and 130b are operated, the indoor air introduced into the intake duct 140 is inhaled to the first blower 130a and is supplied to the cold air passageway 111, and the outdoor air introduced into the intake duct 140 is inhaled to the second blower 130b and is supplied to the warm air passageway 112.

The air supplied to the cold air passageway 111 is cooled while passing through the evaporator 104, and then, flows to the distribution duct 200. After that, the air is discharged to the interior of the vehicle through the air outflow port 220 by the mode door 230 according to the air discharge mode in order to carry out cooling. In this instance, the air supplied to the warm air passageway 112 is heated while passing through the condenser 102, and then, is discharged to the exterior of the vehicle through the warm air discharge port 119b.

B. Heating Mode

Figure 11:
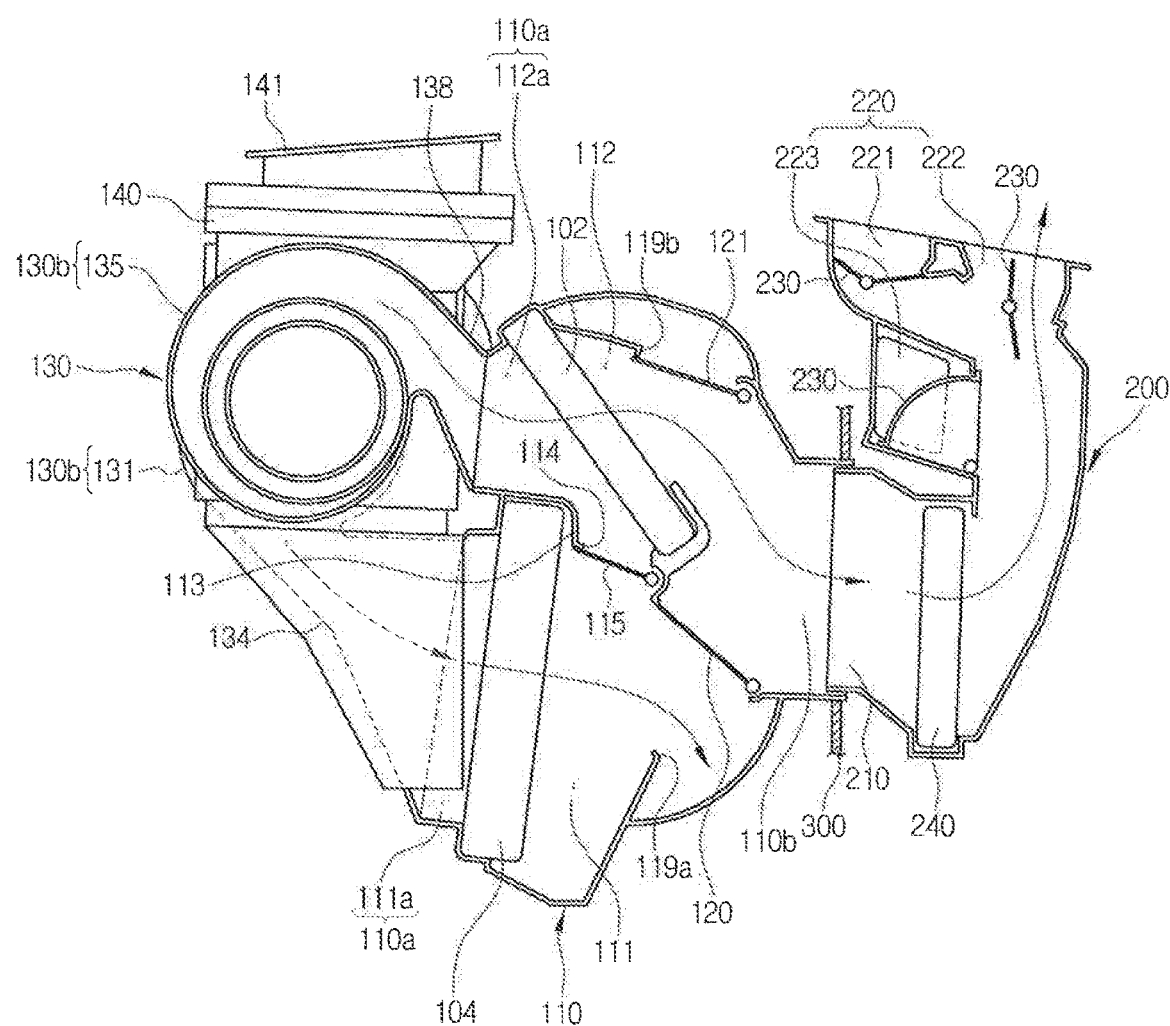
FIG. 11 is a sectional view showing a heating mode of the air conditioning system for the vehicle according to the present invention.

In the heating mode, as shown in FIG. 11, the warm air mode door 121 is operated to open the warm air passageway 112, and the cold air mode door 120 is operated to open the cold air discharge port 119a. Additionally, the first and second indoor and outdoor air converting doors 147 and 148 are operated according to the indoor air inflow mode or the outdoor air inflow mode to selectively supply indoor air or outdoor air toward the first and second blowers 130a and 130b.

Therefore, when the first and second blowers 130a and 130b are operated, the indoor air introduced into the intake duct 140 is inhaled to the first blower 130a and is supplied to the cold air passageway 111, and the outdoor air introduced into the intake duct 140 is inhaled to the second blower 130b and is supplied to the warm air passageway 112.

The air supplied to the warm air passageway 112 is heated while passing through the condenser 102, and then, flows to the distribution duct 200. After that, the air is discharged to the interior of the vehicle through the air outflow port 220 by the mode door 230 according to the air discharge mode in order to carry out heating. In this instance, the air supplied to the cold air passageway 111 is cooled while passing through the evaporator 104, and then, is discharged to the exterior of the vehicle through the cold air discharge port 119a.

C. Mixing Mode

In the mixing mode, as shown in FIG. 12, the cold air mode door 120 is operated to open the cold air passageway 111, and the warm air mode door 121 is operated to open the warm air passageway 112. Additionally, the first and second indoor and outdoor air converting doors 147 and 148 are operated according to the indoor air inflow mode or the outdoor air inflow mode to selectively supply indoor air or outdoor air toward the first and second blowers 130a and 130b.

Therefore, when the first and second blowers 130a and 130b are operated, the indoor air introduced into the intake duct 140 is inhaled to the first blower 130a and is supplied to the cold air passageway 111, and the outdoor air introduced into the intake duct 140 is inhaled to the second blower 130b and is supplied to the warm air passageway 112.

The air supplied to the cold air passageway 111 is cooled while passing through the evaporator 104, and then, flows to the distribution duct 200, and the air supplied to the warm air passageway 112 is heated while passing through the condenser 102 and flows to the distribution duct 200. Continuously, the cold air and the warm air flowing to the distribution duct 200 are mixed together, and then, are discharged to the interior of the vehicle through the air outflow port 220 opened by the mode door 230 according to the air discharge mode.

What is claimed is:

1. An air conditioning system for a vehicle comprising:
    an air-conditioning case having a cold air passageway on which an evaporator is mounted, a warm air passageway on which a condenser is mounted and an outlet for discharging air passing through the cold and warm air passageways to a distribution duct;
    a blower unit including: a first blower for blowing air toward the cold air passageway through a discharge port connected to an inlet of the cold air passageway and a second blower for blowing air toward the warm air passageway through a discharge port connected to an inlet of the warm air passageway; and
    an indoor air inflow duct which is mounted on an outer face of the air-conditioning case and connects the blower unit with the interior of the vehicle so as to introduce the indoor air of the vehicle to the blower unit,
    wherein the outlet of the air-conditioning case and an inlet of the indoor air inflow duct are installed by inserting into a through hole of a dash panel dividing the interior of the vehicle and an engine room and are separated from each other by a partition wall that traverses the through hole.

2. The air conditioning system according to claim 1, wherein an insulator is mounted at one side of the partition wall.

3. The air conditioning system according to claim 1, wherein the separating means has a plurality of partition walls formed between the outlet of the air-conditioning case and the inlet of the indoor air inflow duct to be spaced apart from each other.

4. The air conditioning system according to claim 3, wherein an insulator or a buffering member is mounted between the partition walls.

5. The air conditioning system according to claim 1, wherein the outlet of the air-conditioning case and the inlet of the indoor air inflow duct are arranged to penetrate through the through hole formed in the dash panel which partitions the interior of the vehicle from an engine room.

6. The air conditioning system according to claim 5, wherein a distribution duct is mounted at the outlet of the air-conditioning case to distribute cold air and warm air discharged from the air-conditioning case to specific positions of the interior of the vehicle according to air discharge modes.

7. The air conditioning system according to claim 5, wherein the air-conditioning case is arranged at the engine room side based on the dash panel, and the distribution duct is arranged in the interior of the vehicle.

8. The air conditioning system according to claim 1, wherein an evaporator is mounted in the cold air passageway and a condenser is mounted in the warm air passageway.

9. The air conditioning system according to claim 8, wherein the cold air passageway and the warm air passageway are arranged inside the air-conditioning case in a structure of being put at upper and lower parts of the air-conditioning case, and
    wherein a division wall for dividing the cold air passageway and the warm air passageway from each other inside the air-conditioning case.

10. The air conditioning system according to claim 9, wherein a bypass passageway is formed to penetrate through the division wall disposed between the evaporator and the condenser to communicate the cold air passageway and the warm air passageway with each other, and
    wherein a bypass door is mounted at the bypass passageway to open and close the bypass passageway.

11. The air conditioning system according to claim 8, wherein at one side of the cold air passageway of the air-conditioning case, disposed are a cold air discharge port for discharging the cold air passing through the evaporator to the outside and a cold air mode door for opening and closing the cold air discharge port and the cold air passageway and
    wherein at one side of the warm air passageway of the air-conditioning case, disposed are a warm air discharge port for discharging the warm air passing through the condenser to the outside and a warm air mode door for opening and closing the warm air discharge port and the warm air passageway.

12. The air conditioning system according to claim 1, wherein the blower unit comprises:
    a first blower connected to an inlet of the cold air passageway of the air-conditioning case for blowing air toward the cold air passageway;
    a second blower connected to an inlet of the warm air passageway of the air-conditioning case for blowing air toward the warm air passageway; and
    an intake duct mounted between the first blower and the second blower to respectively supply indoor air and outdoor air to the first blower and the second blower, the intake duct being connected with the indoor air inflow duct to supply the indoor air.

13. The air conditioning system according to claim 1, wherein the outlet of the air-conditioning case and the inlet of the indoor air inflow duct are arranged to be spaced apart from each other.

14. The air conditioning system according to claim 1, further comprising:
    electronic units mounted on the outer face of the air-conditioning case,
    wherein the electronic units are mounted inside the indoor air inflow duct.

15. The air conditioning system according to claim 14, wherein at one side of the cold air passageway of the air-conditioning case, disposed are a cold air discharge port for discharging the cold air passing through the evaporator to the outside and a cold air mode door for opening and closing the cold air discharge port and the cold air passageway,
- wherein at one side of the warm air passageway of the air-conditioning case, disposed are a warm air discharge port for discharging the warm air passing through the condenser to the outside and a warm air mode door for opening and closing the warm air discharge port and the warm air passageway,
- wherein a bypass passageway is formed to penetrate through the division wall disposed between the evaporator and the condenser to communicate the cold air passageway and the warm air passageway with each other, and a bypass door is mounted at the bypass passageway to open and close the bypass passageway, and
- wherein the electronic units are actuators which are mounted on the outer face of the air-conditioning case corresponding to the positions of the cold air mode door and the warm air mode door to actuate the cold air mode door and the warm air mode door or an actuator which is mounted on the outer face of the air-conditioning case corresponding to the position of the bypass door to actuate the bypass door.

16. The air conditioning system according to claim 1, wherein the outlet of the air-conditioning case and the inlet of the indoor air inflow duct are arranged to be adjacent to each other at one side of the air-conditioning case, and
- wherein an auxiliary indoor air intake hole is formed in one side of the air-conditioning case to additionally inhale the indoor air to the indoor air inflow duct.

17. The air conditioning system according to claim 16, wherein the auxiliary indoor air intake hole is formed in a dead zone between the outlet of the air-conditioning case and the outside of the inlet of the indoor air inflow duct in one side of the air-conditioning case.

18. The air conditioning system according to claim 17, wherein a height of the outlet of the air-conditioning case is smaller than a height of the inlet of the indoor air inflow duct, and
- wherein the auxiliary indoor air intake hole is formed in the dead zone, which is formed due to a difference between the height of the outlet of the air-conditioning case and the height of the inlet of the indoor air inflow duct.

19. The air conditioning system according to claim 16, wherein the outlet of the air-conditioning case and the auxiliary indoor air intake hole are arranged in an up-and-down direction, and
- wherein the outlet of the air-conditioning case and the inlet of the indoor air inflow duct are arranged in a right-and-left direction.

20. The air conditioning system according to claim 16, wherein the outlet of the air-conditioning case, the inlet of the indoor air inflow duct and the auxiliary indoor air intake hole are separated from one another by separating means, and
- wherein a connection hole is formed in the separating means disposed between the inlet of the indoor air inflow duct and the auxiliary indoor air intake hole to connect the inlet of the indoor air inflow duct and the auxiliary indoor air intake hole with each other.

* * * * *